US006955866B2

(12) United States Patent
Nimon et al.

(10) Patent No.: US 6,955,866 B2
(45) Date of Patent: Oct. 18, 2005

(54) COATED LITHIUM ELECTRODES

(75) Inventors: Yevgeniy S. Nimon, Walnut Creek, CA (US); May-Ying Chu, Oakland, CA (US); Steven J. Visco, Berkeley, CA (US)

(73) Assignee: PolyPlus Battery Company, Berkeley, CA (US)

( * ) Notice: Subject to any disclaimer, the term of this patent is extended or adjusted under 35 U.S.C. 154(b) by 539 days.

(21) Appl. No.: 10/189,881

(22) Filed: Jul. 3, 2002

(65) Prior Publication Data

US 2002/0182508 A1    Dec. 5, 2002

Related U.S. Application Data

(63) Continuation-in-part of application No. 09/713,997, filed on Nov. 15, 2000, now Pat. No. 6,537,701, which is a continuation-in-part of application No. 09/480,286, filed on Jan. 10, 2000, now Pat. No. 6,165,644, which is a continuation of application No. 09/148,024, filed on Sep. 3, 1998, now Pat. No. 6,017,651.

(51) Int. Cl.⁷ .............................................. H01M 4/58
(52) U.S. Cl. ................. 429/231.95; 429/105; 429/106; 429/107; 429/300; 429/326; 429/327; 429/329; 429/337
(58) Field of Search .............................. 429/300, 188, 429/314, 105, 106, 107, 231.95, 337, 326, 429/327, 329

(56) References Cited

U.S. PATENT DOCUMENTS

| | | | |
|---|---|---|---|
| 3,404,035 A | 10/1968 | Kummer et al. | 136/6 |
| 3,413,150 A | 11/1968 | Kummer et al. | 136/6 |
| 3,532,543 A | 10/1970 | Nole et al. | 136/6 |
| 3,907,591 A | 9/1975 | Lauck | 136/6 |
| 3,915,743 A | 10/1975 | Lauck | 136/6 |
| 3,953,231 A | 4/1976 | Farrington et al. | 136/6 |
| 4,002,492 A | 1/1977 | Rao | 429/194 |
| 4,143,214 A | 3/1979 | Chang et al. | 429/112 |
| 4,268,587 A | 5/1981 | Farrington et al. | 429/193 |
| 4,386,019 A | 5/1983 | Kaun et al. | 252/503 |
| 4,410,609 A | 10/1983 | Peled et al. | 429/105 |
| 4,436,796 A | 3/1984 | Huggins et al. | 429/112 |
| 4,469,761 A | 9/1984 | Bennett et al. | 429/50 |
| 4,644,911 A | 2/1987 | Hidaka et al. | 429/194 |
| 4,784,925 A | 11/1988 | Klinedinst et al. | 429/29 |
| 4,784,927 A | 11/1988 | Klinedinst et al. | 429/196 |

(Continued)

FOREIGN PATENT DOCUMENTS

DE            38 16 199 A1    11/1988    ........... H01M 4/40

(Continued)

OTHER PUBLICATIONS

Abstract of proceedings of the 6th International Symposium on Power Sources 2, 1968, Brighton, Sussex, UK, 24-26, Sep. 1968.

(Continued)

Primary Examiner—Bruce F. Bell
(74) Attorney, Agent, or Firm—Beyer Weaver & Thomas LLP

(57) ABSTRACT

Batteries including a lithium anode stabilized with a metal-lithium alloy and battery cells comprising such anodes are provided. In one embodiment, an electrochemical cell having an anode and a sulfur electrode including at least one of elemental sulfur, lithium sulfide, and a lithium polysulfide is provided. The anode includes a lithium core and a ternary alloy layer over the lithium core where the ternary alloy comprises lithium and two other metals. The ternary alloy layer is effective to increase cycle life and storageability of the electrochemical cell. In a more particular embodiment, the ternary alloy layer is comprised of lithium, copper and tin.

29 Claims, 9 Drawing Sheets

U.S. PATENT DOCUMENTS

| | | | |
|---|---|---|---|
| 4,820,599 A | 4/1989 | Furukawa et al. | 429/194 |
| 4,833,048 A | 5/1989 | Dejonghe et al. | 429/104 |
| 4,889,779 A | 12/1989 | Connolly et al. | 429/196 |
| 4,917,974 A | 4/1990 | De Jonghe et al. | 429/104 |
| 5,162,175 A | 11/1992 | Visco et al. | 429/192 |
| 5,523,179 A | 6/1996 | Chu | 429/104 |
| 5,529,860 A | 6/1996 | Skotheim et al. | 429/213 |
| 5,532,077 A | 7/1996 | Chu | 429/102 |
| 5,582,623 A | 12/1996 | Chu | 29/623.1 |
| 5,648,187 A | 7/1997 | Skotheim | 429/213 |
| 5,686,201 A | 11/1997 | Chu | 429/52 |
| 5,698,339 A | 12/1997 | Kawakami et al. | 429/212 |
| 5,814,420 A | 9/1998 | Chu | |
| 6,017,651 A | 1/2000 | Nimon et al. | 429/101 |
| 6,025,094 A | 2/2000 | Visco et al. | 429/231.95 |
| 6,030,720 A | 2/2000 | Chu et al. | 429/105 |
| 6,051,340 A * | 4/2000 | Kawakami et al. | 429/231.95 |
| 6,165,644 A | 12/2000 | Nimon et al. | 429/231.95 |
| 6,200,704 B1 | 3/2001 | Katz et al. | 429/218.1 |
| 6,225,002 B1 | 5/2001 | Nimon et al. | 429/212 |
| 6,358,643 B1 | 3/2002 | Katz et al. | 429/105 |
| 6,402,795 B1 * | 6/2002 | Chu et al. | 29/623.5 |
| 6,537,701 B1 * | 3/2003 | Nimon et al. | 429/231.95 |
| 6,632,573 B1 * | 10/2003 | Nimon et al. | 429/344 |
| 6,733,924 B1 * | 5/2004 | Skotheim et al. | 429/231.95 |

FOREIGN PATENT DOCUMENTS

| | | |
|---|---|---|
| EP | 0602984 A2 | 6/1994 |
| GB | 2 273 603 A | 10/1984 |
| GB | 2 137406 A | 6/1994 |
| JP | 6-275313 | 9/1994 |
| WO | WO 02/41416 A2 | 5/2002 |
| WO | WO 03/023879 A2 | 3/2003 |

OTHER PUBLICATIONS

Coleman et al., "The Sulfur Electrode" proceedings of the 6th International Symposium on Power sources, pp. 289-302 (1968).

Visco, S.J., Liu, M., Armand, B. and De Jonghe, L.C., Solid Redox Polymerization Electrodes and Their use in All-Solid-State Batteries, Mol. Cryst. Lig. Cryst., 190, p. 198, 1990.

Societe des Accumulateurs Fixes et de Traction, "Lithium-sulfur battery" Abstracts 111055d, Chemical Abstracts 66: 10360; 1967.

DeGott, P., "Polymere Carbone-Soufre Synthese Et Proprietes Electrochimiques,"Doctoral Thesis at l'Institut National Polytechnique de Grenoble, (Date of Defense Jun. 19, 1986).

Lauck, H., "Storage battery with lithium anode and sulfur cathode," Abstract # 9855s, Chemical Abstracts, 80: 467-468; 1974.

Peled et al., Rechargeable Lithium-Sulfur Battery (Extended Abstract), Journal of Power Source, 26: 269-271, 1989.

Peled et al., "Lithium-Sulfur Battery: Evaluation of Dioxolane-Based Electrolytes", J. Electrochem., Soc., 136 (6): 1621-1624, Jun. 1989.

Peramunage and Licht, "A Solid Sulfur Cathode for Aqueous Batteries"; Science 261: 1029-1032, Aug. 20, 1993.

Rauh et al., "Formation of Lithium Polysulfides in Aprotic Media", J. Inorg., Nuc. Chem., 39: 1761-1765, 1977.

Rauh et al. "A Lithium/Dissolved Sulfur Battery with an Organic Electrolyte", J. Electrochem. Soc., 126(4): 523-527, Apr. 1979.

Yamin and Peled, "Electrochemistry of Nonaqueous Lithium/Sulfur Cell", J. Power Sources, 9: 281-287, 1983.

Yamin et al., Lithium Sulfur Battery,: J. Electrochem. Soc., 135(5): 1045-1048, May 1988.

S.J. Visco, M.M. Doeff, and L.C. De Jonghe, "Thin-Film Technology for Solid-State Lithium Batteries Employing Solid Redox Poly-Merization Cathodes", pp. 89-92, Society of Vacuum Coater, 1991.

Liu, Meilin, Visco, Steven J., and De Jonghe, Lutgard C., "Novel Solid Redox Polymerization Electrodes All-Solid State, Thin-Film, Rechargeable Lithium Batteries", J. Electrochem Soc., vol. 138, No. 7, pp. 1891-1895, Jul. 1991.

Ue, Makoto, Visco, Steven J., and De Jonghe, Lutgard C., "Comparison of Cathode Utilization between Polymeric Organodisulfide and Titanium Disulfide in Solid Polymer Electrode Rechargeable Lithium Cells", Denki Kagaku, vol. 61.

Meilin, Lui, "Novel Electrodes for Advanced Energy Storage System", Dissertation for Ph.D. at the University of Berkeley, Chapter 2, pp. 3-6, 1989.

J.R. Coleman, et al., "The Sulfur Electrode", (1968) 289-302, Defense Chemical Biological and Radiation Establishment, Defense Research Board, Ottawa, Canada.

E. Peled, et al. "Rechargeable Lithium-Sulfur Battery (Extended Abstract)", J. Power Sources, 26, 269-271 (1989).

A. Gavrilov, et al. "In Situ Morphological Study of Lithium-Electrolyte Interface", Electrochemical Society, (Extended Abstract).

Kavan, L., Novak, P., and Dousek, F.P., "Electrochimica Acto," vol. 33, No. 11, pp. 1605-1612, Mar. 8, 1988, Great Britain.

Brummer, S.B., et al., "Low Temperature Lithium/Sulfur Secondary Battery (Annual Progress Report, Dec. 1, 1975)," EIC Corporation, Apr. 1976, Newton, Massachusetts.

Larry A. Dominey, "Lithium Batteries"New Materials, Developments and Perspectives, 1994, New York, Industrial Chemistry Library, vol. 5, pp. 137-165.

Ronald Snaith, et al., "Lithium Chemistry" A Theoretical and Exsperimental Overview, 1995, New York, John Wiley & Sons, Inc., pp. 227-477.

Wang, Jiqiang, et al. "Investigations of Binary Lithium-Zinc, Lithium-Cadmium and Lithium-Lead Alloys as Negative Electrodes in Organic Solvent-Based Electrolyte", 1986, Solid State Ionics 20, pp.185-189.

Rao, B.M.L., et al. "Lithium-Aluminus Electrode", Oct. 1977, J. Electrochecm. Soc.: Electrochemical Science and Technology, pp.1490-1492.

Abraham, K.M., "Some Chemistry in Li/ $SOCl_2$ + BrCl Cell", Nov. 1998, J. Electrochem. Soc.: Electrochemical Science and Technology, pp.2686-2691.

Besenhard, J.O., "Cycling Behavior and Corrosion of Li-Al Electrodes in Organic Electrolytes", 1978, J. Electroanal Chem., 94, pp.77-81.

* cited by examiner

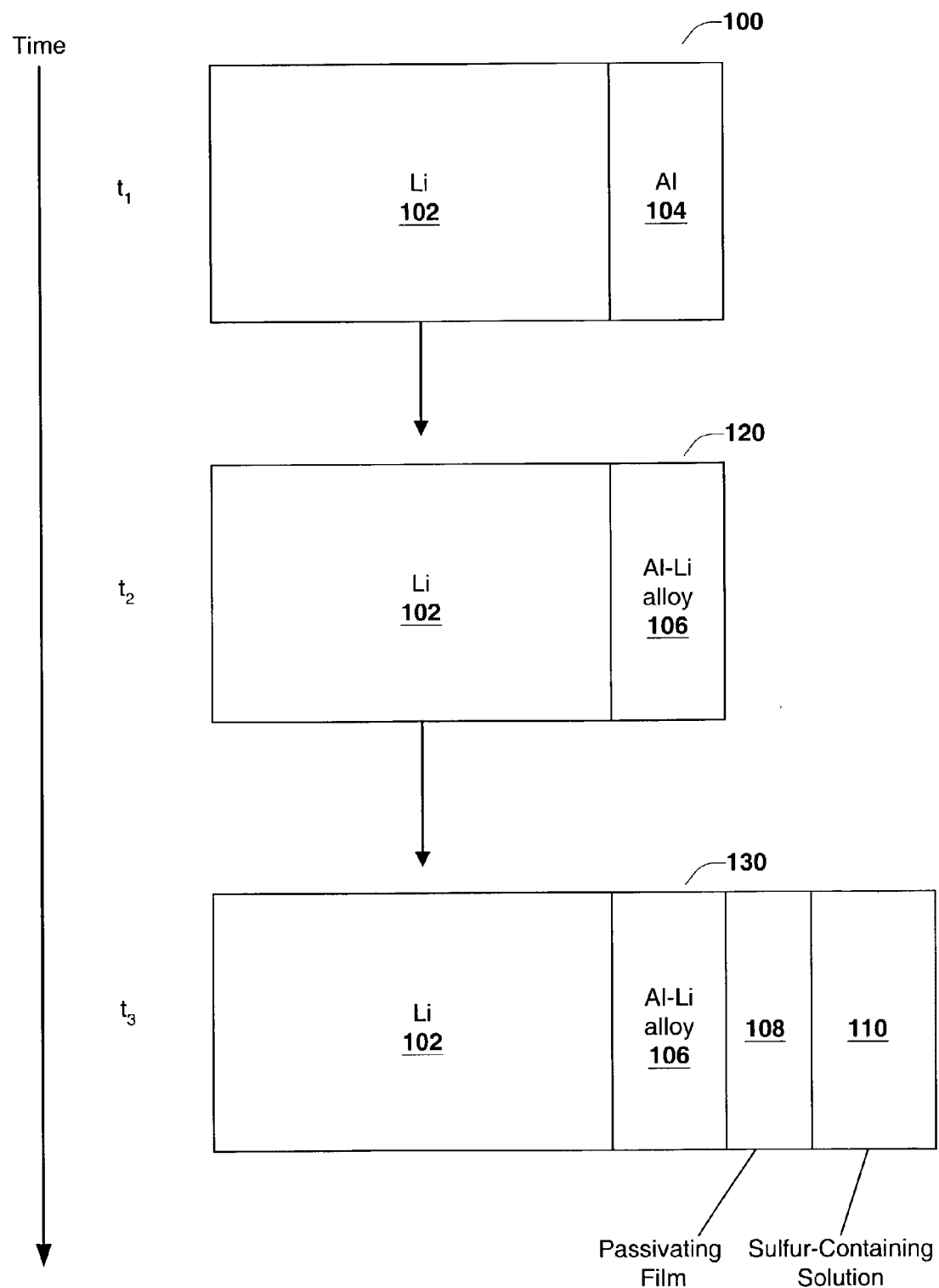

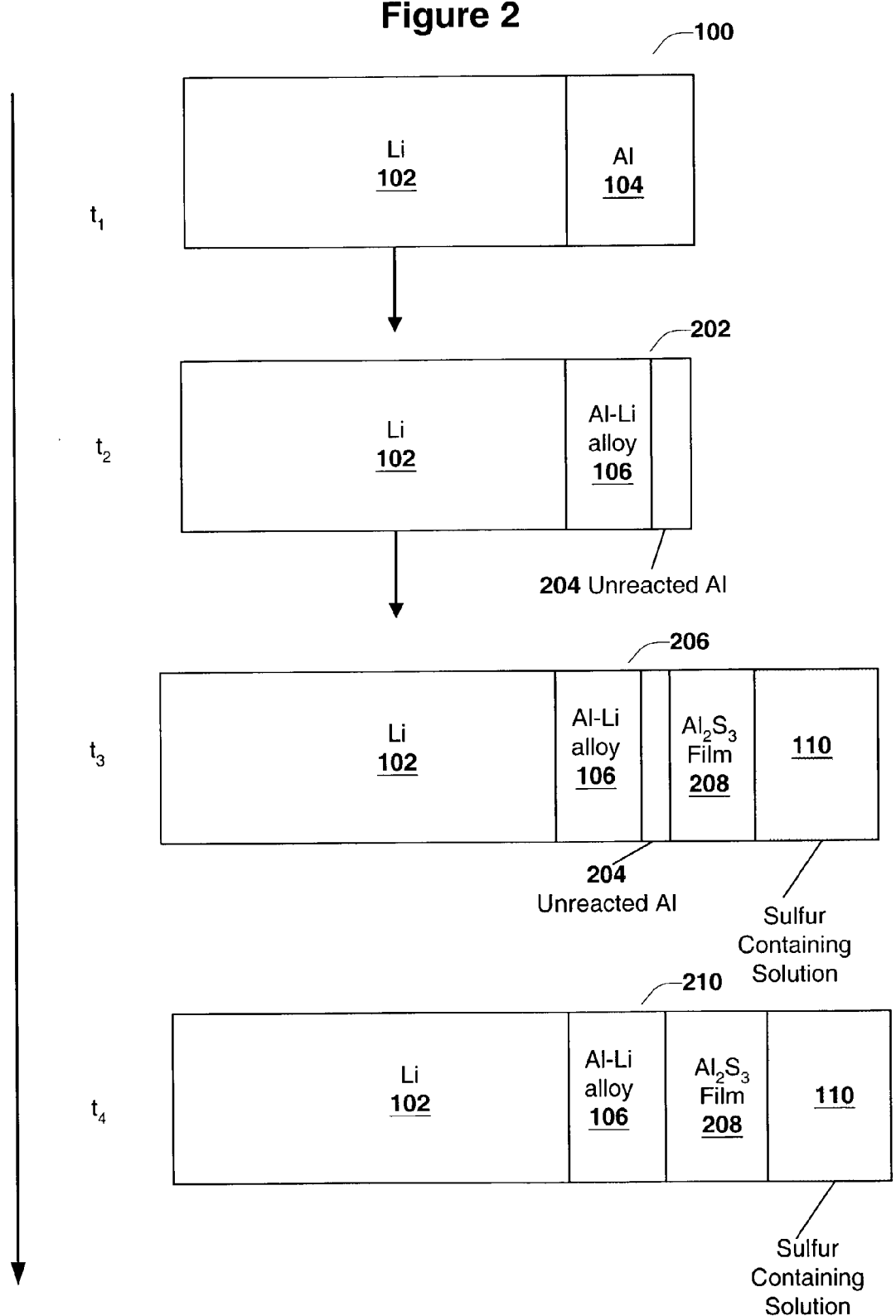

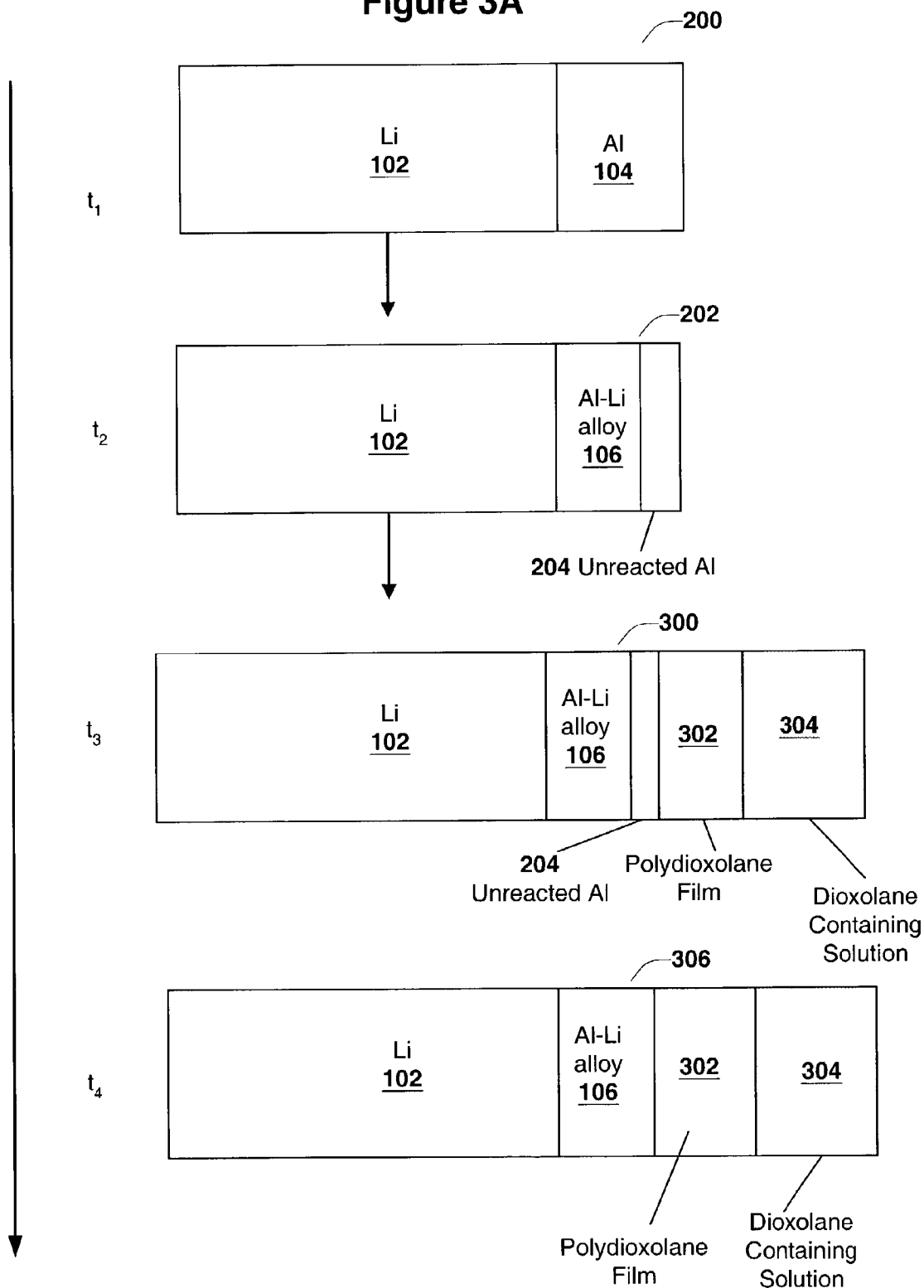

Discharge characteristics of Li/S cells after storage

Discharge characteristics of Li/S cells after storage

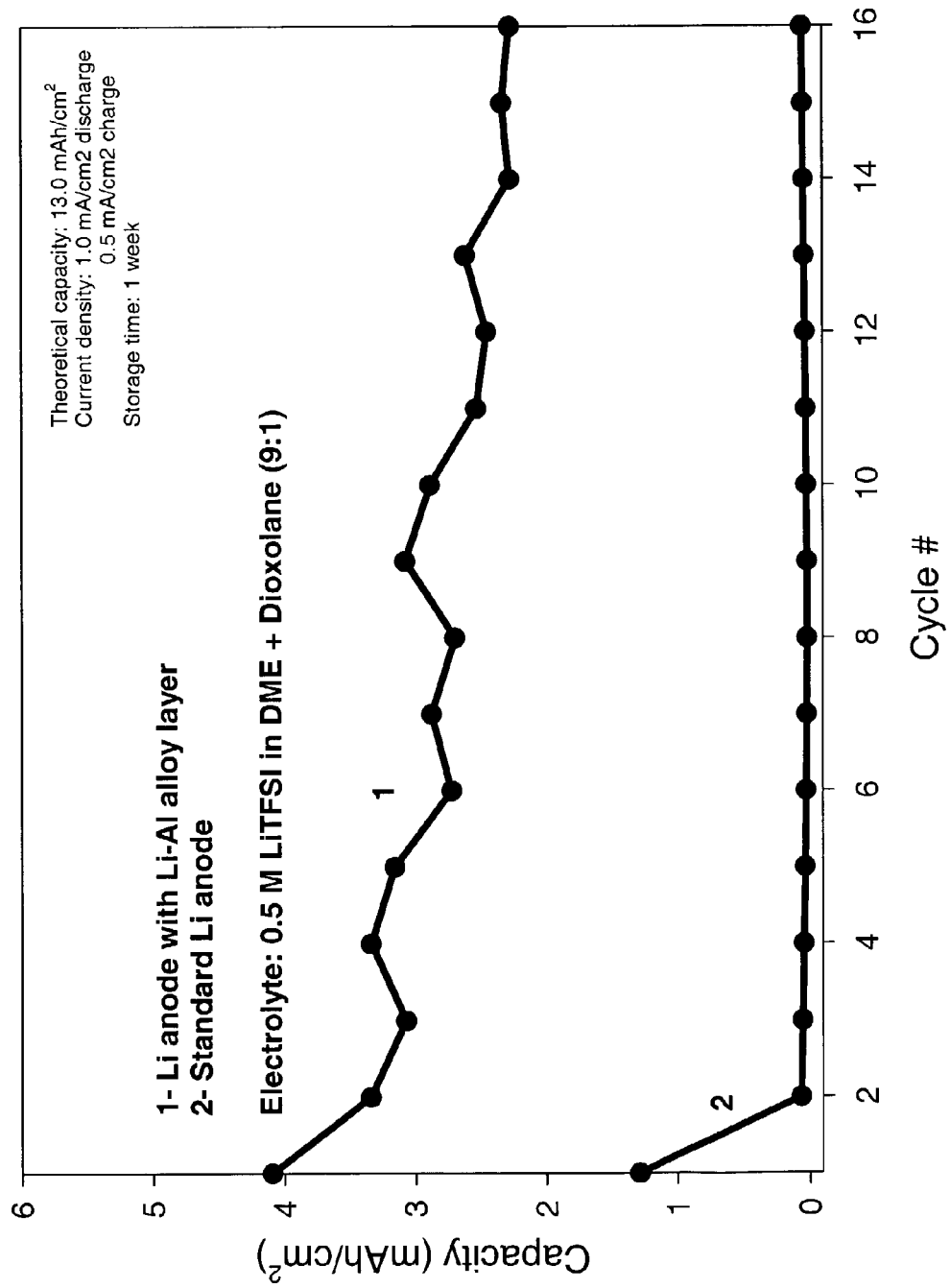

COATED LITHIUM ELECTRODES

CROSS REFERENCE TO RELATED U.S. PATENT APPLICATIONS

This application is a continuation-in-part of U.S. patent application Ser. No. 09/713,997 entitled Coated Lithium Electrodes, filed Nov. 15, 2000 now U.S. Pat. No. 6,537,701; which is a continuation-in-part of U.S. patent application Ser. No. 09/480,286 entitled Methods and Reagents for Enhancing the Cycling efficiency of Lithium Polymer Batteries, filed Jan. 10, 2000 now U.S. Pat. No. 6,165,644; which is a continuation of U.S. patent application Ser. No. 09/148,024 entitled Methods and Reagents for Enhancing the Cycling efficiency of Lithium Polymer, filed Sep. 3, 1998, now U.S. Pat. No. 6,017,651 each of which is incorporated herein by reference in its entirety for all purposes.

BACKGROUND OF THE INVENTION

The present invention relates to electrochemical batteries, and, more specifically, to lithium-metal batteries. More particularly, the present invention relates to methods and compositions that enhance the cycle life and shelf life of lithium-metal batteries, and, especially, lithium-active sulfur batteries. The present invention has applications in the fields of electrochemistry and battery technology.

Lithium battery technology continues to be an attractive option for providing light-weight, yet powerful energy sources. Lithium-sulfur secondary batteries are especially well suited to continuing market demands for more powerful and highly portable electronic devices. Examples of such batteries include those disclosed by De Jonghe, et al, in U.S. Pat. Nos. 4,833,048 and 4,917,974; and by Visco, et al., in U.S. Pat. No. 5,162,175. Nevertheless, the batteries described in these, and other references, have serious limitations (Rauh 1979; De Gott 1986). In particular, batteries using sulfur or polysulfide electrodes in combination with lithium, such as the $Li_2S_x$ batteries described by Peled and Yamin in U.S. Pat. No. 4,410,609, have suffered from poor cycling efficiencies (Rauh 1989).

Many of these difficulties are addressed by the batteries described in U.S. Pat. Nos. 5,523,179 and 5,532,077, both to Chu, each of which is incorporated herein by reference in its entirety and for all purposes. Briefly, the '179 and '077 patents describe solid-state batteries that comprise a lithium electrode in combination with an active sulfur-containing electrode. An "active sulfur" electrode is an electrode comprising elemental sulfur, or sulfur in an oxidation state such that the sulfur would be in its elemental state if the electrode was fully charged. The technology described in these patents is an important advance in lithium battery technology, in particular by describing batteries having large energy densities and good cycling performance.

The cycle life and shelf life of lithium-sulfur batteries is limited by the slow degradation of the lithium electrode surface arising from the formation of dendritic and/or high surface area "mossy lithium". To compensate for active lithium loss, extra lithium must be provided for the lithium electrode increasing the cost and weight of the battery. The use of additional metals also increases the burden of disposing the battery as additional toxic materials must be processed. Mossy lithium can also present a fire hazard by creating fine particles of lithium metal that can ignite on contact with air.

Various attempts have been made to provide lithium batteries having long cycle life and improved stability of the lithium metal anode. To minimize the growth of lithium dendrites, stabilize a lithium metal anode, and improve lithium cycling efficiency, one approach has been to add a metal to the lithium to form a solid metal-lithium alloy electrode. For example, aluminum may be added to the lithium to form a solid aluminum-lithium alloy electrode (Rao 1977). However, as described in Huggins, et al., U.S. Pat. No. 4,436,796, solid lithium-metal alloys such as Li—Al or Li—Si exhibit lower surface kinetics and lose there charge capacities after prolonged cycling. In particular, some types of solid Li—Al alloy electrodes, suffer from problems of shape and mechanical instabilities as well as manufacturing difficulties. Further, as described in Kawakami, et al, U.S. Pat. No. 5,698,339, for use in a rechargeable lithium battery, use of a lithium alloy such as lithium-aluminum alloy as an anode is not practical because the lithium alloy is difficult to fabricate into a spiral form. Therefore, it is difficult to produce a spiral-wound cylindrical rechargeable battery. Further, desirable charging and discharging cycle life or energy density for a rechargeable battery is not easily obtained using lithium-alloys as the anode.

Thus, to take advantage of the stabilizing properties of lithium-metal alloys, which may improve battery cycle life and shelf-life, there remains a need to improve the utilization of lithium-metal alloys in the design of lithium electrodes. The present invention meets these and other needs.

SUMMARY OF THE INVENTION

The present invention provides anode material stabilized with a ternary alloy layer including lithium and two other metals and battery cells comprising such anodes. In one embodiment, an electrochemical cell having an anode and a sulfur electrode including at least one of elemental sulfur, lithium sulfide, and a lithium polysulfide is provided. The anode includes a lithium core and a ternary alloy layer over the lithium core where the ternary alloy comprises lithium and two other metals. The ternary alloy layer is effective to increase cycle life and storageability of the electrochemical cell. In a more particular embodiment, the ternary alloy layer is comprised of lithium, copper and tin.

One aspect of the present invention provides an electrochemical cell. The electrochemical cell may be generally characterized as comprising: i) a positive electrode including at least one of elemental sulfur, lithium sulfide, and a lithium polysulfide; and ii) a negative electrode having a ternary alloy layer comprising Li, a first metal and a second metal that is effective to increase lithium cycling efficiency and anode stability towards electrolyte components during storage of the electrochemical cell, where the first metal provides a matrix that accommodates volume changes in the ternary alloy layer during lithium cycling and where the second metal alloys with lithium and the first metal.

In particular embodiments, the anode is in an electrolyte solution. The electrolyte solution may contain at least one of elemental sulfur, a sulfide, and a polysulfide. Further, the electrolyte solution may contain 1,3-dioxolane as a co-solvent.

In other embodiments, the first metal may be copper and the second metal may be selected from group consisting of tin, silicon, germanium and lead. Also, the first metal may be iron and the second metal may be tin. The tin and the lithium may alloy to form $Li_{4.4}Sn$. When the first metal is copper and the second metal is tin, the copper to tin ratio may be greater than the stoichiometric ratio of copper to tin in the intermetallic compound $Cu_6Sn_5$.

Another aspect of the present invention provides an anode for use in an electrochemical cell. The anode may be generally characterized as comprising: i) a lithium metal layer; and ii) a ternary alloy layer comprising Li, a first metal and a second metal substantially thinner than the lithium metal layer where the first metal provides a matrix that accommodates volume changes in the ternary alloy layer during lithium cycling, the second metal alloys with lithium and the second metal alloys with the first metal and the ternary alloy layer is effective to increase lithium cycling efficiency and anode stability towards electrolyte components during storage of the electrochemical cell.

In particular embodiments, the anode is in an electrolytic solution containing elemental sulfur or polysulfides. The ternary alloy layer may be between about 0.05 and 60 microns thick. The first metal may be copper and the second metal may be selected from group consisting of tin, silicon, germanium and lead. Also, the first metal may be iron and the second metal may be tin. The tin and the lithium may alloy to form $Li_{4.4}Sn$. When the first metal is copper and the second metal is tin, the copper to tin ratio may be greater than the stoichiometric ratio of copper to tin in the intermetallic compound $Cu_6Sn_5$.

Another aspect of the present invention provides a method of forming a lithium anode with a metal-lithium alloy layer for an electrochemical cell. The method may be generally characterized as comprising: 1) depositing a first metal layer on an outer surface of the lithium foil; 2) depositing a second metal layer on an outer surface of the lithium foil; 3) alloying the first metal layer and the second metal layer on the outer surface of the lithium foil to form a first metal-second metal alloy layer; and 4) alloying the lithium foil and the first metal-second metal alloy layer on the outer surface of the lithium foil to form a ternary alloy layer comprising lithium, the first metal and the second metal where the lithium anode is effective to increase lithium cycling efficiency and anode stability towards electrolyte components during storage of the electrochemical cell.

In particular embodiments, the first metal layer may be deposited using sputtering, plasma deposition, rolling or physical deposition. Also, the second metal layer may be deposited using sputtering, plasma deposition, rolling or physical deposition. The ternary alloy layer may be between about 0.05 to 60 microns thick. The lithium electrode may be in an electrolyte solution wherein the electrolyte solution may contain at least one of elemental sulfur, a sulfide, and a polysulfide.

In other embodiments, the first metal layer may not alloy with lithium. The first metal layer may be copper and the second metal layer may be selected from group consisting of tin, silicon, germanium and lead. The first metal layer may be iron and the second metal layer may be tin. When tin is used as a metal layer, the tin and the lithium may alloy to form $Li_{4.4}Sn$. When the first metal layer is copper and the second metal layer is tin, the copper to tin ratio may be greater than the stoichiometric ratio of copper to tin in the intermetallic compound $Cu_6Sn_5$.

Another aspect of the present invention provides a battery cell. The battery cell may be generally characterized as comprising: a.) a positive electrode comprising a mixture of i.) an electrochemically active material, and ii.) an electronically conductive material, b). a negative electrode (anode) comprising a lithium layer with a ternary alloy layer comprising lithium, a first metal and a second metal that is effective to increase lithium cycling efficiency and anode stability towards electrolyte components during storage of the electrochemical cell; and c.) an electrolyte electronically separating the positive and negative electrodes. For the ternary alloy layer, the first metal may be copper and the second metal may be selected from group consisting of tin, silicon, germanium and lead. Also, in another embodiment, the first metal may be iron and the second metal may be tin.

These and other aspects and advantages will become apparent when the Description below is read in conjunction with the accompanying Drawings.

BRIEF DESCRIPTION OF THE DRAWINGS

FIG. 1 is a block diagram illustrating the formation of an aluminum-lithium alloy on the surface of a lithium metal foil with a passivating film over the aluminum-lithium alloy layer for one embodiment of the present invention.

FIG. 2 is a block diagram illustrating the formation of an aluminum-lithium alloy on the surface of a lithium foil with a passivating film over the aluminum-lithium alloy surface where the passivating film is formed from reaction products of aluminum and the sulfur containing solution for one embodiment of the present invention.

FIG. 3A is a block diagram illustrating the formation of an aluminum-lithium alloy layer on the surface of a lithium foil with a passivating film over the aluminum-lithium alloy layer where the passivating film is formed from the dioxolane containing solution for one embodiment of the present invention.

FIG. 8 illustrates effect of aluminum-lithium alloy layer on cycling performance of Li/S cells after storage.

DESCRIPTION OF SOME EMBODIMENTS OF THE INVENTION

Figure 3B:
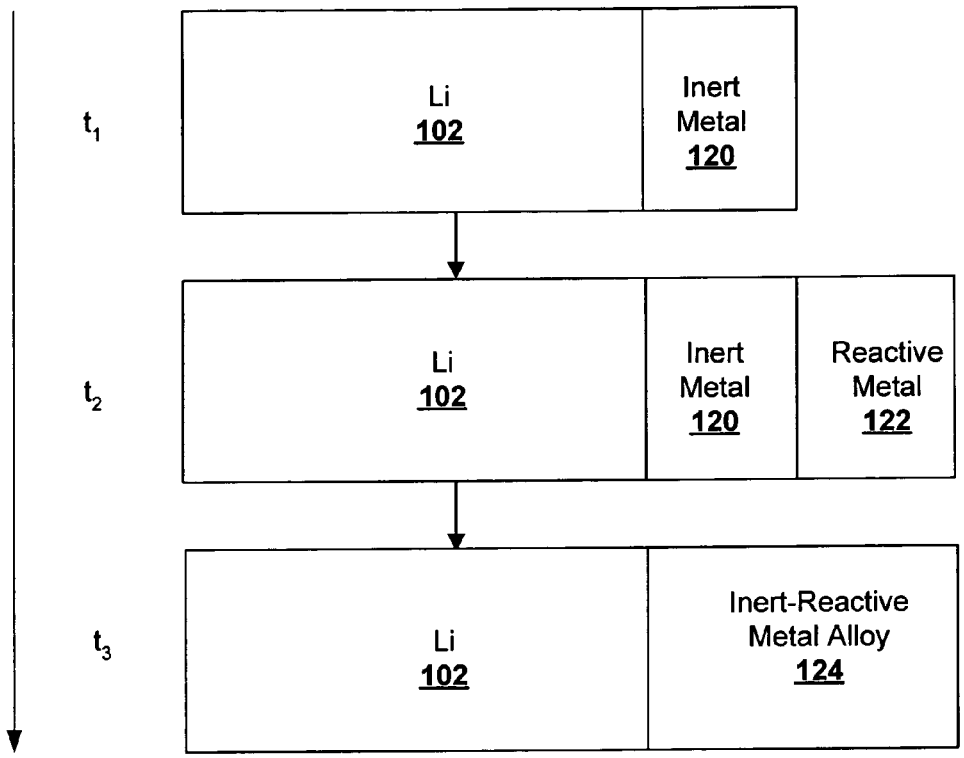
FIGS. 3B and 3C are block diagrams illustrating the formation of a ternary alloy on the surface of a lithium metal anode.

In the following description, the invention is presented in terms of certain specific compositions, configurations, and processes to help explain how it may be practiced. The invention is not limited to these specific embodiments. For example, while much of the following discussion focuses on lithium systems, the invention pertains more broadly to the class of active metal battery systems (e.g., batteries having negative electrodes of alkali metals, alkaline earth metals, and certain transition metals).

The present invention provides lithium anodes and battery cells, methods and reagents for making and using lithium anodes, and batteries having improved cycle life and shelf life. More particularly, the methods and reagents provided herein include methods for fabricating a lithium anode with a metal-lithium alloy layer and agents that modify the anode surface to increase the cycle life and shelf life of electrochemical cells using such electrodes. Without wishing to be bound by any particular theory of action, it is believed that the methods and reagents described herein act to prevent the anode degradation, namely, reduce and/or prevent mossy and inactive lithium formation. These methods and reagents include processes, as described below, for forming a metal-lithium alloy layer on the surface of a lithium core and forming a surface coating over the metal-lithium alloy layer. Specifically, methods and reagents for forming an aluminum-lithium alloy layer on a lithium anode are described. These methods and reagents provide lithium batteries having improved cycle life, increased shelf-life, and reduced voltage delay after initiation of battery discharge.

Thus, in a general aspect, the present invention provides an electrochemical cell having a lithium metal anode with a metal-lithium alloy layer including a surface coating that is effective to increase the lithium cycling efficiency and anode stability during storage of the electrochemical cell. In a more particular aspect, the electrochemical cell includes an electrolyte solution, and, still more particularly, a polysulfide-containing electrolyte solution. Several embodiments of the invention are presented below.

In a first aspect, the present invention includes methods and reagents for making lithium batteries in which the lithium anode of the battery has a metal-lithium alloy layer near the outer surface of the lithium core and a surface coating that is formed by contacting the metal-lithium alloy layer with an electrolyte. The anode may be fabricated using a process in which alloying of the metal and lithium surface layer is completed prior to forming the surface coating. The resulting lithium anode contains 3 layers: 1) a lithium core, 2) a metal-lithium alloy layer, and 3) a surface coating over the metal-lithium alloy layer. In a more particular embodiment, the metal-electrode alloy layer is an aluminum-lithium metal alloy layer and the surface coating is a product of a chemical reaction between the aluminum-lithium metal alloy layer and elemental sulfur, sulfide or polysulfide.

FIG. 1 is a block diagram illustrating the formation of an aluminum-lithium alloy on the outer surface of an anode with a passivating film over the aluminum-lithium alloy layer for one embodiment of the present invention. Three stages at times $t_1$, $t_2$, and $t_3$, in the fabrication process of the lithium electrode 100 are shown. At time $t_1$, the lithium core 102 of the anode 100 may be coated with an aluminum surface layer 104 using ordinary methods and materials known to those of skill in the electrochemical or metallurgical arts. For example, the aluminum surface layer 104 may be deposited on a lithium core 102 using sputtering, plasma deposition, rolling or physical deposition (e.g. contacting the lithium electrode surface with a sheet of aluminum foil). The lithium core 102 may vary in shape or size depending on the type of battery application. In general, the aluminum layer 104 is substantially thinner than the lithium core 102.

After depositing the aluminum layer 104 on the lithium core 102, an aluminum-lithium alloy layer is gradually formed on the lithium core 102 via diffusion of lithium into the aluminum layer 104. At an intermediate stage, a lithium/aluminum-lithium alloy/aluminum structure will exist. The diffusion process may be modified by heating anode 100 at various temperatures below the melting point of the lithium core 102. In general, heating the anode 100 will increase the rate of lithium diffusion into the aluminum layer 104. Additionally, the alloying process may be performed within a particular atmospheric environment. For example, the aluminum surface layer may be alloyed while the anode 100 is sealed in a container of some type containing dry air or an inert gas such as argon.

In a particular embodiment, an outer surface of a lithium foil sheet, which may be the lithium core 102, may be mechanically polished using a medical grade Tyvec fabric. A sandwich structure is built comprising an outer liner, the lithium foil sheet, an aluminum foil sheet, which may be the aluminum layer 104, and an outer liner. The aluminum foil sheet is pressed to the polished surface of the lithium foil sheet. The lithium foil sheet may be between about 10 and 200 microns thick and the aluminum foil sheet may be between about 0.05 and 10 microns thick. The sandwich structure may be sealed inside a Fresco gas impermeable bag with an aluminum laminate inner surface. The Fresco bag may contain dry air or some inert gas such as argon. The sandwich structure is pressed at a first pressure between about 10–30 psi at a first temperature between about 20° C. and 80° C. for about 0.5 to 5 hours. Next, the sandwich structure may be pressed at a second pressure between about 5000 and 7000 psi for about 0.5 and 5 hours using a hydraulic press or some other device to apply pressure to the sandwich structure. After the second pressing, the sandwich structure may be heated at a second temperature between about 20° C. and 80° C. for a time between about 5 and 15 hours. Typically, the sandwich structure is stored at elevated temperature below the melting point of lithium. The pressing of the foil sheets may decrease the time for alloying. The resulting aluminum-lithium alloy layer uniformly adheres to the lithium core 102. When the aluminum-lithium alloy layer does not uniformly adhere to the lithium surface, the resulting aluminum-lithium alloy layer may be brittle and easily break off.

The aluminum-lithium alloying process may be monitored for completion by monitoring the surface reflectivity of the aluminum layer 104. An aluminum surface typically has a much larger reflectivity than an aluminum-lithium alloy surface. Thus, when the aluminum-lithium alloying is near completion, a drop in the reflectivity of the aluminum surface is observed as aluminum-lithium alloy reaches the surface.

In FIG. 1, after alloying of the aluminum-lithium alloy layer is complete at time $t_2$, the anode 120 is substantially comprised of two layers 1) a layer of lithium metal 102 and 2) an aluminum-lithium alloy layer 106. At time $t_3$, the anode 130 may be immersed in an electrolytic solution of some type to form a surface coating 108 on the outer surface. In a particular embodiment, the anode 130 is immersed in a sulfur containing solution 110, which may include elemental sulfur, sulfides and polysulfides. For example, as described above, the aluminum-lithium alloy layer of the two-layer lithium/aluminum-lithium anode formed using the sandwich structure may be coated with a sulfur containing solution to form a surface coating on the aluminum-lithium alloy layer.

The surface coating 108 acts as a passivating film 108 to prevent the degradation of the anode surface during cell storage and the formation of a mossy dendritic lithium surface during cycling. It may be comprised of a reaction product of sulfur, sulfides or polysulfides and the aluminum-lithium surface layer 108 or other additives in the sulfur containing solution 110. For example, other chemical species may be added to the electrolytic solution that react with the aluminum-lithium surface to form a passivating film 108. The anode may be fabricated using a process in which alloying of the metal and lithium surface layer is completed prior to forming the surface coating. The resulting anode contains 3 layers: 1) a lithium core, 2) a metal-lithium alloy layer, and 3) a surface coating over the metal-lithium alloy layer. In a more particular embodiment, the metal-electrode alloy layer is an aluminum-lithium metal alloy layer and the surface coating is a product of a chemical reaction between the aluminum-lithium metal alloy layer and elemental sulfur, sulfide or polysulfide.

Both the surface coating layer 108 and the aluminum-lithium alloy layer help to stabilize the underlying lithium core 102 and improve lithium cycling efficiency and stability towards the components of the electrolyte when the anode 103 is employed in a battery. The surface coating 108 on the anode 130 may be formed before the anode 130 is assembled or after the anode 130 is assembled within a battery. In battery design as described below, one embodiment of a battery utilizing an anode as described.

In a specific embodiment, prior to the depositing of the aluminum layer 104 on the lithium core 102 on the anode 100 at time $t_1$, an aluminum layer may be deposited on an inert substrate which is inert to aluminum and any subsequent aluminum-lithium alloys that are formed. For example, an aluminum layer may be deposited on a plastic substrate. Thus, when aluminum is deposited over the surface of the substrate, an aluminum layer may be formed. After forming the aluminum layer on the inert substrate, the aluminum layer may be pressed on the lithium core 102 to form an aluminum-lithium layer between the lithium core 102 and the inert substrate. After an aluminum-lithium alloy layer has form on the lithium core, the inert substrate may be removed. The resulting lithium core may be covered with the aluminum-lithium layer. This lithium core may be used in the cell. The embodiment is not limited to aluminum and other metals that alloy with lithium may be deposited on the inert substrate such as the plastic substrate in the above described process.

In other specific embodiments, a number of metals may be deposited on the lithium foil to generate lithium-metal alloy layer over the lithium core 102. For example, at time $t_1$, a layer of transition- or alkaline earth metals such as, but not limited to, magnesium (Mg), bismuth (Bi), tin (Sn), lead (Pb), cadmium (Cd), silicon (Si), indium (In), silver (Ag) and gallium (Ga) may be deposited on the surface of the lithium core 102. In other example, aluminum alloyed with another metal or an alloy of two other metals may be deposited on the surface of the lithium core 102. These metals may be deposited using one or more methods appropriate for use with the given metal such as sputtering, rolling, physical vapor deposition or physical deposition. After completing the alloying process, a Mg—Li alloy layer, a Bi—Li alloy layer, a Sn—Li alloy layer, Pb—Li alloy layer, a Cd—Li alloy layer, a Si—Li alloy layer, an In—Li alloy layer, an Ag—Li alloy layer, a Ga—Li alloy layer, an (Al-metal alloy)-Li alloy layer or a ternary alloy containing Li and two other metals may be formed over the lithium core 102 to enable various types of anodes. A typical metal-lithium alloy layer is between 0.05 and 10 microns thick and is usually substantially thinner than the thickness of the lithium layer. The various alloy surface may be coated or immersed in an electrolytic solution containing sulfur, sulfide, polysulfide or other compounds that result in a passivating film 108 forming over the metal-lithium alloy surface. In general, the surface coating 108 is a reaction product of the metal-lithium alloy surface and one or more compounds in the electrolytic solution.

For a Li—S battery with an anode with an aluminum-lithium alloy layer and a passivating film, one objective of the passivating film is to reduce polysulfide reduction. To achieve this objective, the passivating film is typically thin, uniform and ionically conductive. Thus, Li deposition is the only process that takes place during cell charging. A Li—S battery cell with these characteristics may have an improved cycle life and an increased shelf life. Batteries using lithium anodes having an aluminum-lithium alloy layer and a surface coating layer fabricated according to the present invention with sulfur-loaded positive electrodes have been found to have superior discharge characteristics compared with untreated lithium metal anodes under the same conditions. As discussed below in Experiment 1, a Li/S cell having a lithium anode with about 0.8 micron aluminum-lithium alloy layer and the passivating layer exhibited about a 3.5 times larger capacity than the Li/S cell without an aluminum-lithium alloy layer. This result indicates that anodes treated in accordance with the present invention have superior stability towards electrolyte components compared with lithium anodes lacking such treatment.

In another aspect of the present invention, the anode may be fabricated using a process in which a surface coating is formed on the surface of the lithium foil prior to completion of the alloying of the metal and lithium surface layer. As described above, the resulting anode contains 3 layers: 1) a lithium core, 2) a metal-lithium alloy layer, and 3) a surface coating over the metal-lithium alloy layer. However, the surface coating may be formed based on a reaction between an initial metal layer and some compound in the electrolyte solution. In a more particular embodiment, the metal-electrode alloy layer is an aluminum-lithium metal alloy layer and the surface coating is a product of a chemical reaction between an aluminum surface layer and elemental sulfur, sulfide or polysulfide (e.g. $Al_2S_3$).

FIG. 2 is a block diagram illustrating the formation of an aluminum-lithium alloy on the surface of an anode with a passivating film over the aluminum-lithium alloy surface where the passivating film is formed from reaction products of aluminum and the sulfur containing solution for one embodiment of the present invention. As described with reference to FIG. 1, at time $t_1$, an aluminum surface layer 104 is deposited in some manner on the surface of the lithium core 102 of the anode 100. Next, the aluminum surface layer 104 is alloyed to the lithium core 102 to begin formation of an aluminum-lithium metal layer. As described with reference to FIG. 1, the alloying process may involve heating and pressing the aluminum layer to regulate the diffusion of lithium into the aluminum.

At time $t_2$, the anode 202 is comprised of three layers: 1) the lithium core 102, 2) an aluminum-lithium alloy layer 106 below the surface of the anode 202 and 3) an unalloyed aluminum layer 204. In general, the alloying process begins at the interface between the aluminum layer and the lithium layer. As the alloying process progresses, a layer of aluminum-alloy forms at the interface and grows until the aluminum-lithium alloy layer reaches the surface of the anode. As described with reference to FIG. 1, the surface reflectivity of aluminum is much greater than the reflectivity of the aluminum-lithium alloy. Thus, for a given alloying process, the time required for the aluminum-lithium alloy layer to reach the surface of the anode may be determined. Between the time when the aluminum-lithium layer consumes all of teh unreacted lithium core 102 and the time when the aluminum-lithium layer consumes all of the unreacted aluminum, the unreacted aluminum may be used to form surface coatings.

At time $t_3$, while a layer of aluminum 204 remains on the surface of the anode 206, the anode 206 is immersed in a sulfur containing solution 110 to form a surface coating. Thus, the anode 206 contains four layers: 1) a surface film 208, 2) a layer of unreacted aluminum 204, 3) an aluminum-lithium alloy 106 and 4) a lithium core 102. The sulfur may be in the form of elemental sulfur, sulfide or polysulfide and the coating process may occur before the electrode is assembled into a battery or after the battery is assembled. The sulfur in the sulfur containing solution 110 may react with the unreacted aluminum 204 to form an $Al_2S_3$ film on the surface of the unreacted aluminum layer 204. The thickness of the film may be affected by the time in the alloying process when the aluminum layer 204 is coated with the sulfur containing solution 110. For example, the final thickness $Al_2S_3$ film 208 may be greater when the aluminum layer is immersed into the sulfur containing solution soon after the alloying process begins then when the alloying process is near completion. In another embodiment, the sulfur containing solution or some other reagent used to form a surface coating on the aluminum surface layer may be applied before the aluminum layer is applied to the lithium core 102 i.e. before time $t_1$. Then, after a surface coating is formed on the aluminum, the aluminum surface layer with a surface coating may be alloyed to the lithium core 102 as shown at time $t_1$.

At time $t_4$, after the lithium-aluminum alloying process is completed, the anode 210 is composed of three layers: 1) a lithium core 102, 2) an aluminum-lithium alloy layer 106 and 3) an $Al_2S_3$ film 208. At time $t_3$, The $Al_2S_3$ film 208 is in contact with the sulfur containing solution 110 which may be consistent with the anode 210 assembled in a battery. However, as previously mentioned, the surface coating, in particular the $Al_2S_3$ film, may be formed prior to assembly of the battery. As discussed in Experiment 2 below, a Li/S cell having a lithium anode with about 0.8 micron aluminum-lithium alloy layer and the $Al_2S_3$ film exhibited about a 3.0 times larger capacity than the Li/S cell without an aluminum-lithium alloy layer and the $Al_2S_3$ film. This result indicates that anodes treated in accordance with the present invention have superior cycling efficiencies and energy delivery characteristics compared with lithium metal electrodes lacking such treatment.

As described with reference to FIG. 1, a number of metals may be used instead of aluminum in FIG. 2. For example, at time $t_1$, a layer of transition- or alkaline earth metals such as, but not limited to, magnesium (Mg), bismuth (Bi), tin (Sn), lead (Pb), cadmium (Cd), silicon (Si), indium (In), silver (Ag), gallium (Ga) or their alloys may be deposited on the surface of the lithium core 102. These metals may be deposited using one or more methods appropriate for use with the given element such as sputtering, rolling, physical vapor deposition or physical deposition. After completing the alloying process, a Mg—Li alloy layer, a Bi—Li alloy layer, a Sn—Li alloy layer, Pb—Li alloy layer, a Cd—Li alloy layer, a Si—Li alloy layer, an In—Li alloy layer, an Ag—Li alloy layer, a Ga—Li alloy layer, or surface layer consisting of ternary alloy between lithium and two other metals may be formed over the lithium core 102 to enable various types of anodes. While a layer of the elemental metal remains on the surface of the lithium electrode, the metal may be immersed in a sulfur containing solution 110 or some other electrolytic solution to form a surface coating comprising a reaction product of the elemental metal and some compound in the electrolytic solution. After alloying is complete, the anode comprises three layers: 1) a lithium core, 2) a metal-lithium alloy layer and 3) a surface coating comprising a reaction product of the elemental metal and a some other compound. The compound is selected such that the surface coating increases the lithium cycling efficiency and anode stability towards electrolyte components during storage of a battery using an anode with the surface coating.

In another aspect of the present invention, the anode may be fabricated using a process in which a surface coating is formed on the surface of the anode prior to completion of the alloying of the metal and lithium surface layer using surface electrochemistry. As described above with references to FIGS. 1 and 2, the resulting anode contains 3 layers: 1) a lithium core, 2) a metal-lithium alloy layer, and 3) a surface coating over the metal-lithium alloy layer. However, the surface coating may be formed based on a compound in the electrolytic solution that requires a positive oxidizing potential to form on the metal surface. In a more particular embodiment, the metal-electrode alloy layer is an aluminum-lithium metal alloy layer and the surface coating is a film based on poly(dioxolane) resulting from the electrooxidation of dioxolane at the aluminum surface.

FIG. 3A is a block diagram illustrating the formation of an aluminum-lithium alloy on the surface of a lithium anode with a passivating film over the aluminum-lithium alloy surface where the passivating film is formed from the dioxolane containing solution for one embodiment of the present invention. As described with reference to FIGS. 1 and 2, at time $t_1$, an aluminum surface layer 104 is deposited in some manner on the surface of the lithium core 102 of the anode 100. Next, the aluminum surface layer 104 is alloyed to the lithium core 102 to form an aluminum-lithium metal surface layer. As described with reference to FIG. 3A, at time $t_2$, the anode 202 is comprised of three layers: 1) the lithium core 102, 2) an aluminum-lithium alloy layer 106 below the surface of the anode 202 and 3) an unalloyed layer of aluminum 204.

At time $t_3$, while a layer of aluminum 204 remains on the surface of the anode 300, the anode 300 is immersed in a dioxolane containing solution 304 to form a surface coating. Thus, the anode 300 contains four layers: 1) a surface film 302, 2) a layer of unreacted aluminum 204, 3) an aluminum-lithium alloy 106 and 4) a lithium core 102. The electrolyte solution 304 contains 1,3 dioxolane. When a sufficient positive potential about 4.5 V vs. $Li/Li^+$ is applied to the aluminum layer 204, electrochemical polymerization of dioxolane is initiated on the aluminum surface. After a particular time period, the aluminum may be coated with a film based on poly(1,3-dioxolane). When electrooxidation of the dioxolane is allowed to occur only for a short period of time i.e. the passed capacity is small, the resulting polymer film is thin. Thus, the film thickness may be varied by varying the electrooxidation time. Other compounds which may be utilized to form a surface coating on an aluminum surface layer include products of electroreduction of electrolyte components. In addition, films on the lithium electrode may be formed by passing a current through the aluminum-lithium alloy layer after alloying of the aluminum layer is completed.

At time $t_4$, after the lithium-aluminum alloying process is completed, the anode 306 is composed of three layers: 1) a lithium core 102, 2) an aluminum-lithium alloy layer 106 and 3) a film based upon polydioxolane 302. As discussed in Experiment 3 below, a cell having a lithium anode with about 0.8 micron aluminum-lithium alloy layer and the poly(dioxolane) based passivating film exhibited better cycling characteristics than a Li/S cell with a lithium electrode without the aluminum-lithium layer. This result indicates that anodes treated in accordance with the present invention have superior cycling and energy delivery characteristics compared with anodes lacking such treatment.

The electrooxidation method described above may be utilized with the lithium and aluminum sandwich structure as described with reference to FIG. 1. Additionally, the electrooxidation may be performed prior to assembly of the battery containing the lithium anode or directly in a battery cell filled with an electrolyte solution containing dioxolane. Without wishing to be bound by any theory, one benefit of the formation of the passivating film based on poly-dioxolane may be the stabilization of the anode containing Al—Li layer during prolonged storage and cycling of a battery. An advantage of the alloying processes described above in FIGS. 1, 2 and 3 is that the processes may take place after the electrochemical cell using a lithium anode with a metal-lithium alloy surface coating is assembled. For example, an aluminum foil sheet may be laminated to a lithium foil sheet to form an anode. Before the alloying of the aluminum sheet to the lithium foil sheet has been completed, the anode may be assembled in a battery. In the assembled battery, a surface of the aluminum sheet may contact an electrolyte solution to form a surface coating on the anode comprised of a reaction product of aluminum and some compound in the electrolyte solution (e.g. $Al_2S_3$ in a Li/S battery). Further, in the assembled battery, the aluminum sheet may be replaced by an aluminum-lithium alloy after completion the alloying process.

Another advantage of the alloying processes described above in FIGS. 1, 2 and 3A is that a surface coating may be formed on the metal layer that is alloyed to the lithium foil sheet prior to the assembly of the cell. For example, a surface coating may be formed on an aluminum sheet. After the surface coating is formed on the aluminum sheet, it may be bonded to the lithium foil sheet. As a result, a wider choice of treatment procedures may be available to form the surface coating.

As described with respect to FIGS. 1, 2, 3A, a metal layer may be formed on a lithium anode and assembled into a battery. During charging of the battery, lithium ions may intercolate from the electrolyte into the metal coating to form a lithium-metal alloy on the surface of the lithium anode. During discharge of the battery, lithium ions may interocolate from the lithium-metal alloy into the electrolyte leaving areas of metal on the surface of the lithium anode. The transition from a lithium-metal alloy to a metal or from the metal to a lithium-metal alloy may produce a large change in volume. For example, during a transition from a binary lithium-metal alloy to a metal, a change in volume of up to 300% may occur. During cycling of the battery involving repeated charging and discharging, the large change in volume within the surface coating of the lithium electrode may result in a loss of mechanical integrity and degradation of the surface coating resulting in a disintegration of the surface coating.

Figure 3C:
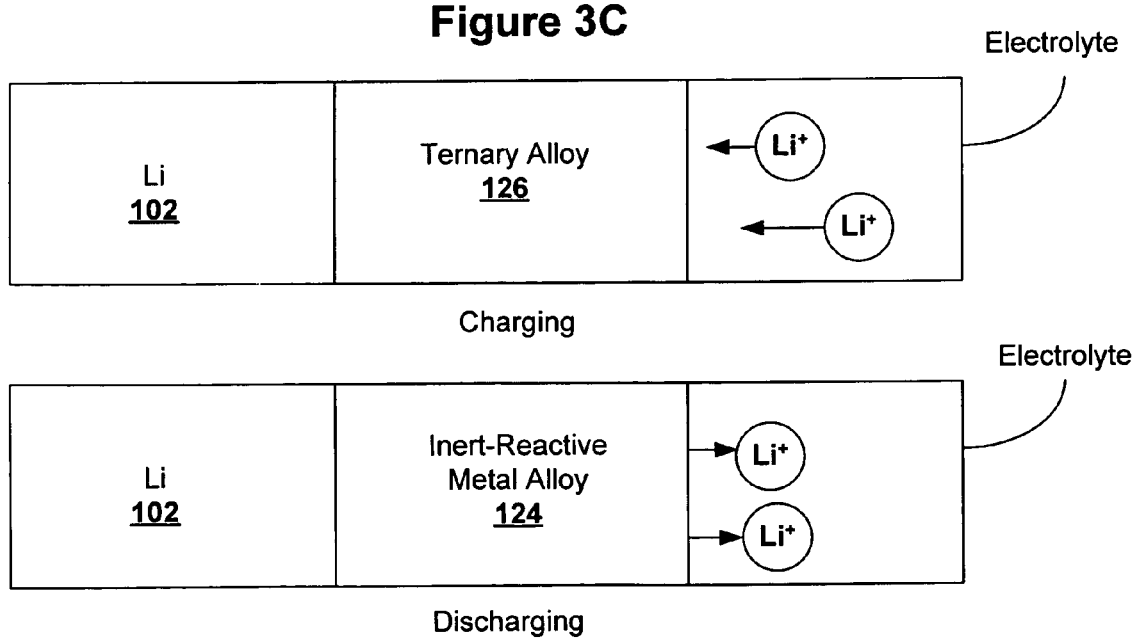

FIGS. 3B and 3C illustrate the formation of a ternary alloy layer 126 on the surface of a lithium anode 102. The ternary alloy layer 126 comprises lithium and two other metals The two other metals may be selected to reduce the changes in volume that occur in the ternary alloy layer during charging and discharging of a battery using the lithium anode with the ternary alloy surface layer. In one embodiment of the present invention, the two other metals forming the ternary alloy layer 126 with lithium may be comprised of an inert metal that does not form an alloy with lithium and a reactive metal that forms an alloy with lithium. Further, the reactive metal and the inert metal may form an alloy with each other.

In a particular embodiment, an alloy comprising copper (Cu) and tin (Sn) may be deposited on the surface of a lithium anode. In this example, copper is the inert metal and does not form an alloy with lithium. The tin is the reactive metal and may form an alloy, such as $Li_{4.4}Sn$ alloy, with the lithium. Further, the copper and tin alloy with each other. Without wishing to be bound by any particular theory of action, it is believed that during charging and discharging of the battery as shown in FIG. 3C, the copper provides an inert matrix that accommodates the changes volume that occur during $Li_{4.4}Sn$ formation and degradation. The reduction in the changes in volume during cycling for lithium-copper-tin ternary alloy surface layer as compared to a lithium-metal binary surface layer allows the ternary alloy surface layer to stay on the lithium anode a longer amount of time with less degradation as compared to the lithium-metal binary surface layer.

In FIG. 3B, the formation of a ternary alloy layer 126 on the surface of lithium anode 102 is shown. At time $t_1$, an inert metal layer 120 is deposited on the surface of the lithium anode. The inert metal layer 120 may be formed on the lithium anode 102 using conventional processes that allow for thin film deposition such as but not limited to evaporation, thermal deposition, sputtering, plasma deposition or rolling. The inert material employed with this invention forms a physically rigid layer of material in the inert metal layer 120 that does not alloy with lithium. Further, the inert material does not easily migrate into lithium or otherwise detrimentally affect the electrochemical properties of lithium. Examples of materials that may be useful as an inert material in the inert metal layer 120 include but are not limited copper, nickel, iron, many forms of stainless steel, zinc, chromium and compatible alloys thereof.

At time $t_2$, after the inert metal layer 120 has been deposited on the lithium anode 102, a reactive metal layer 122 may be deposited on the inert metal layer 120. The reactive metal is selected such that it forms alloys with both the lithium and the inert metal deposited at time $t_1$. The reactive metal layer 122 may be deposited on the inert material metal layer 120 using conventional processes that provide thin film deposition such as but not limited to evaporation, thermal deposition, sputtering, plasma deposition or rolling. Tin is one example of a reactive metal that be used with the present invention. Other examples of inert and reactive metal systems that may be used to form a ternary allow with lithium include but are not limited to iron and tin, silicon and tin, copper and silicon, copper and germanium and copper and lead.

Between times $t_2$ and $t_3$, the reactive metal layer 122 and the inert metal layer 120 are alloyed. For instance, alloying may result from diffusion of the reactive material into the inert material. At time $t_3$, an inert-reactive metal alloy layer 124 is formed on the lithium anode 102. The thickness of the inert-reactive metal alloy layer 124 may vary according to the inert and reactive materials that are used. Typically, the thickness of the layer 124 is between about 0.05 microns to about 60 microns and preferably the thickness is about 2 microns. At the interface between lithium anode 102 and the inert-reactive metal alloy layer 124, a ternary alloy layer 126 may form comprising lithium alloyed with the reactive metal and the reactive metal alloyed with the inert metal. During the charge and discharge cycles, the thickness of this ternary alloy layer may expand as lithium is alternately plated and electrolytically consumed on the anode.

In one embodiment of the present invention, at time $t_1$, copper (Cu) may be used as an inert metal and a copper layer may be deposited on the lithium anode 102. Next, at time $t_2$, tin (Sn) may be used as the reactive metal and a tin layer may be deposited on the copper layer. The tin and copper layers may be allowed to cure for a few hours to form a tin-copper alloy layer. The thickness of the tin-copper alloy layer may be between about 0.05 microns to about 60 microns and preferably the thickness of the layer is about 2 microns. The copper to tin ratio in the deposited layers is typically greater than the stoichiometric ratio of copper to tin in the intermetallic compound $Cu_6Sn_5$. The tin and copper layers may be cured at temperature below about 100° C. and preferably at about room temperature of 25° C. During charge, the lithium and tin form an alloy of $Li_{4.4}Sn$ (see FIG. 3C).

Figure 5A:
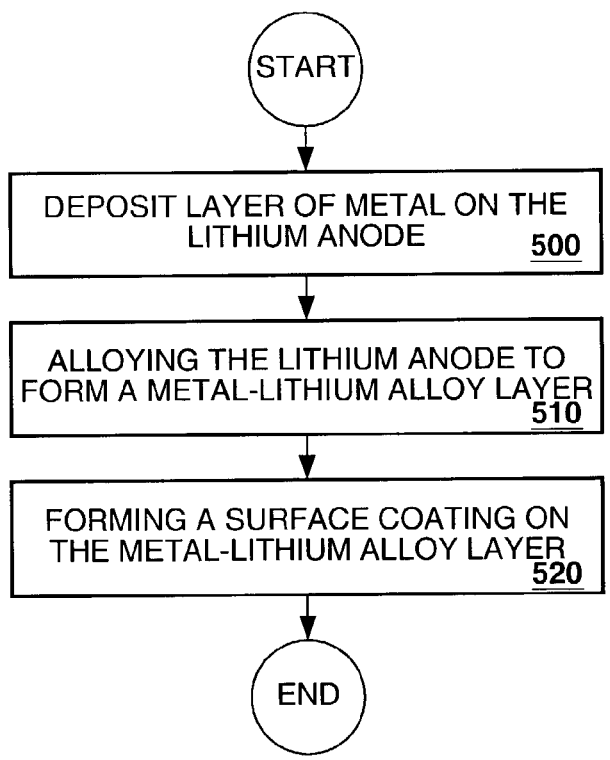
FIGS. 5A and 5B is a flow chart describing a method for forming a metal-lithium alloy layer on the surface of a lithium electrode.
Figure 5B:
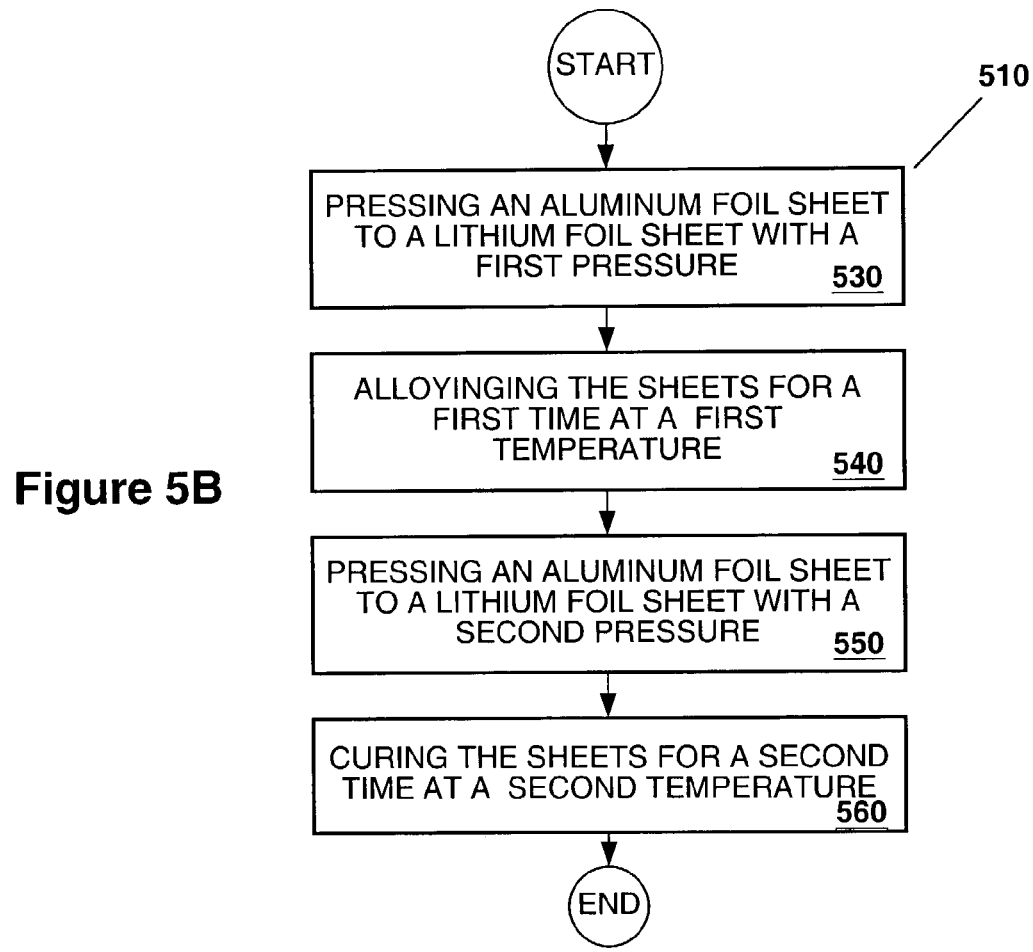

FIGS. 5A and 5B is a flow chart describing a method for forming a metal-lithium alloy on the surface of a lithium foil sheet consistent with the embodiments described in FIGS. 1, 2 and 3. In box 500, a metal layer is deposited on the surface of a lithium foil sheet. In box 510, the lithium foil and metal layer are alloyed to form a metal-lithium alloy layer. One embodiment of this alloying stage is described in FIG. 5B. In box 520, a surface coating is formed on the metal-lithium alloy layer. The surface coating may be a reaction product of the metal-lithium or metal and a compound in the electrolyte solution or a film formed from electrochemical reactions of components of the electrolyte solution.

In FIG. 5B, a specific embodiment of alloying a metal layer to a lithium foil sheet to form a metal-lithium alloy layer is described. The specific embodiment was described with reference to FIG. 1. In box 530, an aluminum foil sheet is pressed to a lithium foil sheet at a first pressure. In box 540, the sheets in the form of a sandwich structure are alloyed at a first temperature, which is below the melting point of lithium, and a first time. In box 550, the sandwich structure is pressed at a second pressure. Increasing the pressure between the aluminum and lithium tends to increase the surface adhesion between the foils and produce a more durable aluminum-lithium alloy layer. In box 560, the sandwich structure is alloyed for a second time at a second temperature. While the aluminum-lithium alloy layer is being formed, various surface coatings may be formed on the anode. The surface coating may be formed before box 530, between boxes 530 and 560, or after box 560 depending on the type of coating that is being applied.

Batteries

Battery Design

Batteries of this invention may be constructed according to various known processes for assembling cell components and cells. Generally, the invention finds application in any cell configuration. The exact structure will depend primarily upon the intended use of the battery unit. Examples include thin film with porous separator, thin film polymeric laminate, jelly roll (i.e., spirally wound), prismatic, coin cell, etc.

Generally, batteries employing the negative electrodes of this invention will be fabricated with a separate electrolyte that is distinct from the surface treatment layer. It is possible, however, that the surface layer could by itself serve as a solid state electrolyte. If a separate electrolyte is employed, it may be in the liquid, solid (e.g., polymer), or gel state. It may be fabricated together with the negative electrode as a unitary structure (e.g., as a laminate). Such unitary structures will most often employ a solid or gel phase electrolyte.

The negative electrode is spaced from the positive electrode, and both electrodes may be in material contact with an electrolyte separator. Current collectors contact both the positive and negative electrodes in a conventional manner and permit an electrical current to be drawn by an external circuit. In a typical cell, all of the components will be enclosed in an appropriate casing, plastic for example, with only the current collectors extending beyond the casing. Therefore, reactive elements, such as sodium or lithium in the negative electrode, as well as other cell elements are protected.

Figure 4:
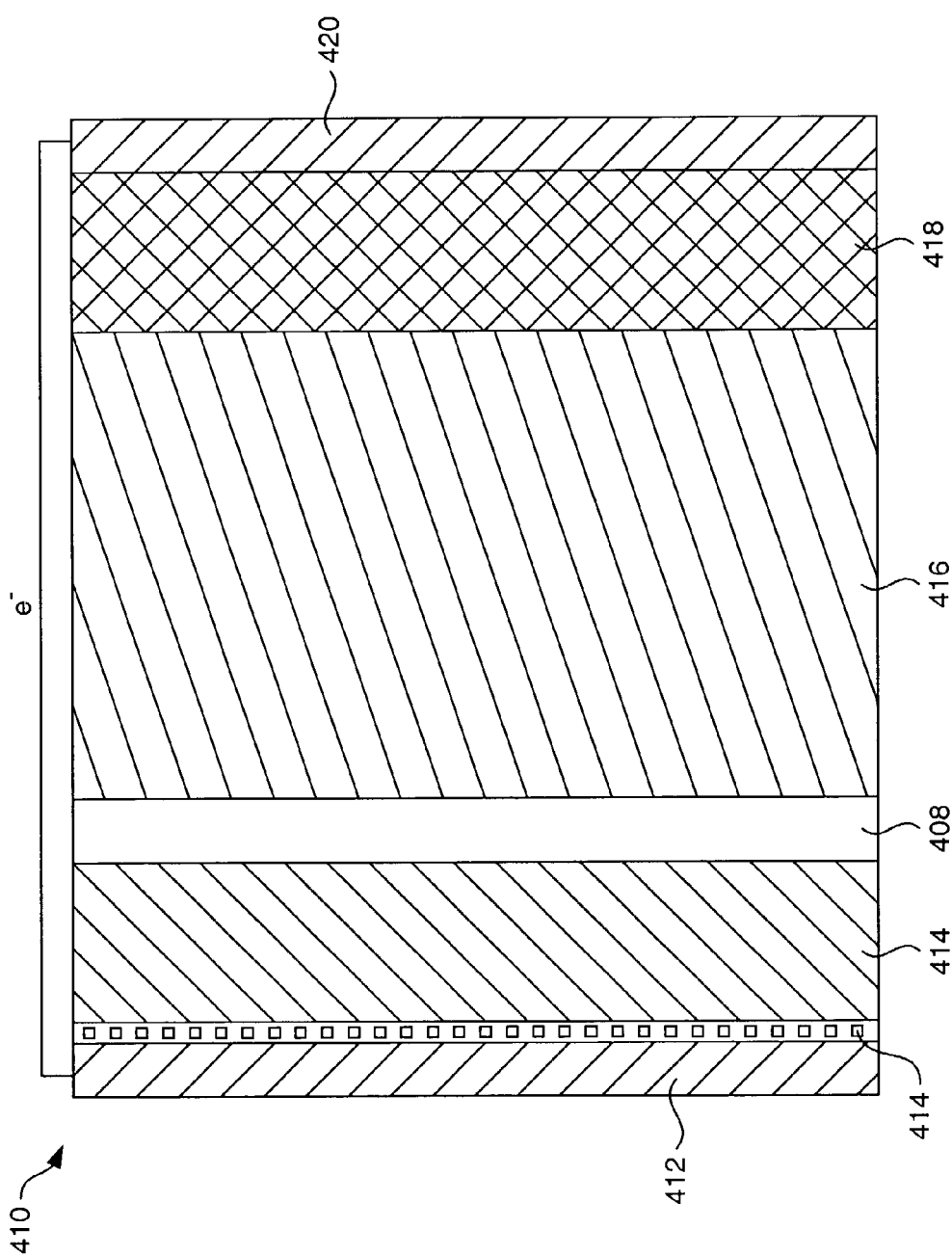
FIG. 4 is a schematic figure of a battery in accordance with one embodiment of the invention.

Referring now to FIG. 4, a cell 410 in accordance with a preferred embodiment of the present invention is shown. Cell 410 includes a negative current collector 412 which is formed of an electronically conductive material. The current collector serves to conduct electrons between a cell terminal (not shown) and a negative electrode 414 (such as lithium) to which current collector 412 is affixed. Negative electrode 414 is made from lithium or other similarly reactive material, and includes a surface layer 408 formed opposite current collector 412. Surface layer 408 of negative electrode 414 contacts an electrolyte in an electrolyte region 416. As mentioned, the electrolyte may be liquid, gel, or solid (e.g., a polymer). To simplify the discussion of FIG. 4, the electrolyte may sometimes be referred to as "liquid electrolyte." An example of a solid electrolyte is polyethylene oxide. An example of gel electrolyte is polyethylene oxide containing a significant quantity of entrained liquid such as an aprotic solvent.

A positive electrode 418 abuts the side of electrolyte region 416 opposite negative electrode 414. As electrolyte region 416 is an electronic insulator and an ionic conductor, positive electrode 418 is ionically coupled to but electronically insulated from negative electrode 414. Finally, the side of positive electrode 418 opposite electrolyte region 416 is affixed to a positive current collector 420. Current collector 420 provides an electronic connection between a positive cell terminal (not shown) and positive electrode 418.

Current collector 420 should resist degradation in the electrochemical environment of the cell and should remain substantially unchanged during discharge and charge. In one embodiment, the current collectors are sheets of conductive material such as aluminum or stainless steel. The positive electrode may be attached to the current collector by directly forming it on the current collector or by pressing a preformed electrode onto the current collector. Positive electrode mixtures formed directly onto current collectors preferably have good adhesion. Positive electrode films can also be cast or pressed onto expanded metal sheets. Alternately, metal leads can be attached to the positive electrode by crimp-sealing, metal spraying, sputtering or other techniques known to those skilled in the art. Some positive electrode can be pressed together with the electrolyte separator sandwiched between the electrodes. In order to provide good electrical conductivity between the positive electrode and a metal container, an electronically conductive matrix of, for example, carbon or aluminum powders or fibers or metal mesh may be used.

An optional inert separator in region 416 prevents electronic contact between the positive and negative electrodes. Such separators are commonly used in liquid electrolyte systems. A separator may occupy all or some part of electrolyte compartment 416. Preferably, it will be a highly porous/permeable material such as a felt, paper, or microporous plastic film. It should also resist attack by the electrolyte and other cell components under the potentials experienced within the cell. Examples of suitable separators include glass, plastic, ceramic, and porous membranes thereof among other separators known to those in the art. In one specific embodiment, the separator is CELGARD 2300 or CELGARD 2400 available from Celgard, LLC of Charlotte, N.C.

In an alternative embodiment, no separator is employed. The surface layer on the negative electrode prevents the positive and negative electrodes from contacting one another and serves the function of a separator. In such cases, the surface layer should be tough. It may be relatively thick and made from a material that resists cracking and abrasion.

In some embodiments of the invention, the cell may be characterized as a "thin film" or "thin layer" cell. Such cells possess relatively thin electrodes and electrolyte separators. Preferably, the positive electrode is no thicker than about 300 μm, more preferably no thicker than about 150 μm, and most preferably no thicker than about 100 μm. The negative electrode preferably is no thicker than about 100 μm and more preferably no thicker than about 100 µm. Finally, the electrolyte separator (when in a fully assembled cell) is no thicker than about 100 µm and more preferably no thicker than about 40 µm.

The present invention can be used with any of a number of battery systems employing a highly reactive negative electrode such as lithium or other alkali metal. For example, any positive electrode used with lithium metal or lithium ion batteries may be employed. These include lithium manganese oxide, lithium cobalt oxide, lithium nickel oxide, lithium vanadium oxide, etc. Mixed oxides of these compounds may also be employed such as lithium cobalt nickel oxide. As will be explained in more detail below, a preferred application of the electrodes of this invention is in lithium-sulfur batteries.

While the above examples are directed to rechargeable batteries, the invention may also find application in primary batteries. Examples of such primary batteries include lithium-manganese oxide batteries, lithium—$(CF)_x$ batteries, lithium sulfur dioxide batteries, lithium iodine batteries, lithium nickel oxide batteries, lithium vanadium oxide batteries, and nickel cobalt oxide batteries. Additionally, other electrochemically active materials (e.g. Cobalt oxide, Vanadium oxide, Spinel Manganese oxide, Molybdenum oxide or Nickel oxide) besides sulfur may be used as the cathode material in combination with lithium electrodes as described herein to form electrochemical cells. The electrochemical cells may be primary or secondary batteries.

The surface layer, which includes the metal-lithium alloy layer and a surface coating, allows one to use a reactive lithium metal electrode in a manner that resembles the use of lithium ion batteries. Lithium ion batteries were developed because they had a longer cycle life and better safety characteristics than metal lithium batteries. The relatively short cycle life of metallic lithium batteries has been due, in part, to the formation of dendrites and/or high surface area "mossy" lithium which can grow from the lithium electrode across the electrolyte and to the positive electrode where they short circuit the cells. Not only do these short circuits prematurely lead to cell failure, they pose a serious safety risk. The surface layer of this invention prevents formations of dendrites and/or mossy lithium and thereby improves the cycle life and safety of metallic lithium batteries. Further, the batteries of this invention will perform better than lithium ion batteries because they do not require a carbon intercalation matrix to support lithium ions. Because the carbon matrix does not provide a source of electrochemical capacity, it simply represents unproductive weight that reduces a battery's energy density. Because the present invention does not employ a carbon intercalation matrix, it has a higher energy density than a conventional lithium ion cell—while providing better cycle life and safety than metallic lithium batteries studied to date. In addition, the lithium metal batteries of this invention do not have a large irreversible capacity loss associated with the "formation" of lithium ion batteries.

Lithium-Sulfur Batteries

Sulfur positive electrodes and metal-sulfur batteries are described in U.S. Pat. No. 5,686,201 issued to Chu on Nov. 11, 1997 and U.S. Pat. No. 6,030,720 issued to Chu et al. on Feb. 29, 2000. Both of these documents are incorporated by reference for all purposes. The sulfur positive electrodes preferably include in their theoretically fully charged state sulfur and an electronically conductive material. At some state of discharge, the positive electrode will include one or more polysulfides and possibly sulfides, which are polysulfides and sulfides of the metal or metals found in the negative electrode. In some embodiments, the fully charged electrode may also include some amount of such sulfides and/or polysulfides.

The positive electrode is fabricated such that it permits electrons to easily move between the sulfur and the electronically conductive material, and permits ions to move between the electrolyte and the sulfur. Thus, high sulfur utilization is realized, even after many cycles. If the lithium-sulfur battery employs a solid or gel state electrolyte, the positive electrode should include an electronic conductor (e.g., carbon) and an ionic conductor (e.g., polyethylene oxide) in addition to the sulfur electroactive material. If the battery employs a liquid electrolyte, the positive electrode may require only an electronic conductor in addition to the sulfur electroactive material. The electrolyte itself permeates the electrode and acts as the ionic conductor. In the case of a liquid electrolyte cell, the battery design may assume two formats: (1) all active sulfur (elemental sulfur, polysulfides and sulfides of the positive electrode) is dissolved in electrolyte solution (one phase positive electrode) and (2) the active sulfur is distributed between a solid phase (sometimes precipitated) and a liquid phase.

When the metal-sulfur battery cells of this invention include a liquid electrolyte, that electrolyte should keep many or all of sulfur discharge products in solution and therefore available for electrochemical reaction. Thus, they preferably solubilize lithium sulfide and relatively low molecular weight polysulfides. In a particularly preferred embodiment, the electrolyte solvent has repeating ethoxy units ($CH_2CH_2O$). This may be a glyme or related compound. Such solvents are believed to strongly coordinate lithium and thereby increase the solubility of discharge products of lithium-sulfur batteries. Suitable liquid electrolyte solvents are described in more detail in U.S. patent application Ser. No. 08/948,969, previously incorporated by reference.

It should be understood that the electrolyte solvents of this invention may also include cosolvents. Examples of such additional cosolvents include sulfolane, dimethyl sulfone, dialkyl carbonates, tetrahydrofuran (THF), 1-3-dioxolane, propylene carbonate (PC), ethylene carbonate (EC), dimethyl carbonate (DMC), butyrolactone, N-methylpyrrolidinone, dimethoxyethane (DME or glyme), hexamethylphosphoramide, pyridine, N,N-diethylacetamide, N,N-diethylformamide, dimethylsulfoxide, tetramethylurea, N,N-dimethylacetamide, N,N-dimethylformamide, tributylphosphate, trimethylphosphate, N,N,N',N'-tetraethylsulfamide, tetraethylenediamine, tetramethylpropylenediamine, pentamethyldiethylenetriamine, methanol, ethylene glycol, polyethylene glycol, nitromethane, trifluoroacetic acid, trifluoromethanesulfonic acid, sulfur dioxide, boron trifluoride, and combinations of such liquids.

The surface layers employed in this invention may allow the use of electrolyte solvents that work well with sulfides and polysulfides but may attack lithium. Examples of solvents in this category include amine solvents such as diethyl amine, ethylene diamine, tributyl amine, amides such as dimethyl acetamide and hexamethyl phosphoramide (HMPA), etc.

As mentioned, the battery cells of this invention may include a solid-state electrolyte. An exemplary solid-state electrolyte separator is a ceramic or glass electrolyte separator which contains essentially no liquid. Specific examples of solid-state ceramic electrolyte separators include beta alumina-type materials such as sodium beta alumina, Nasicon™ or Lisicon™ glass or ceramic. Polymeric electrolytes, porous membranes, or combinations thereof are examples of a type of electrolyte separator which may include an aprotic organic liquid to produce a solid-state electrolyte separator preferably containing less than 20% liquid. Suitable polymeric electrolytes include polyethers, polyimines, polythioethers, polyphosphazenes, polymer blends, and the like and mixtures and copolymers thereof in which an appropriate electrolyte salt has optionally been added. Preferred polyethers are polyalkylene oxides, more preferably, polyethylene oxide.

In the gel-state, the electrolyte separator preferably contains at least 20% (weight percentage) of an organic liquid (see the above listed liquid electrolytes for examples), with the liquid being immobilized by the inclusion of a gelling agent. Many gelling agents such as polyacrylonitrile, polyvinylidene difluoride (PVDF), or polyethylene oxide (PEO), can be used.

It should be understood that some separators employing liquid electrolytes entrained in porous polymer matrices are commonly referred to as "polymer" separator membranes. Such systems are considered liquid electrolyte systems within the context of this invention. The membrane separators employed in these systems actually serve to hold liquid electrolyte in small pores by capillary action. Essentially, a porous or microporous network provides a region for entraining liquid electrolyte. Such separators are described in U.S. Pat. No. 3,351,495 assigned to W. R. Grace & Co. and U.S. Pat. Nos. 5,460,904, 5,540,741, and 5,607,485 all assigned to Bellcore, for example. Each of these patents is incorporated herein by reference for all purposes.

The fully charged state of some cells of this invention need not require that the positive electrode be entirely converted to elemental sulfur. It may be possible in some cases to have the positive electrode be a highly oxidized form of lithium polysulfide, for example, as in $Li_2S_x$ where x is five or greater. The fully charged positive electrode may also include a mixture of such polysulfides together with elemental sulfur and possibly even some sulfide. It should be understood that during charge, the positive electrode would generally not be of uniform composition. That is, there will be some amount of sulfide, sulfur, and an assortment of polysulfides with various values of x. Also, while the electrochemically active material includes some substantial fraction of "sulfur," this does not mean that the positive electrode must rely exclusively upon sulfur for its electrochemical energy.

The electronic conductor in the positive electrode preferably forms an interconnected matrix so that there is always a clear current path from the positive current collector to any position in the electronic conductor. This provides high availability of electroactive sites and maintained accessibility to charge carriers over repeated cycling. Often such electronic conductors will be fibrous materials such as a felt or paper. Examples of suitable materials include a carbon paper from Lydall Technical Papers Corporation of Rochester, N.H. and a graphite felt available from Electrosynthesis Company of Lancaster, N.Y.

The sulfur is preferably uniformly dispersed in a composite matrix containing an electronically conductive material. Preferred weight ratios of sulfur to electronic conductor in the sulfur-based positive electrodes of this invention in a fully charged state are at most about 50:1, more preferably at most about 10:1, and most preferably at most about 5:1. The sulfur considered in these ratios includes both precipitated or solid phase sulfur as well as sulfur dissolved in the electrolyte. Preferably, the per weight ratio of electronic conductor to binder is at least about 1:1 and more preferably at least about 2:1.

The composite sulfur-based positive electrode may further optionally include performance enhancing additives such as binders, electrocatalysts (e.g., phthalocyanines, metallocenes, brilliant yellow (Reg. No. 3051-11-4 from Aldrich Catalog Handbook of Fine Chemicals; Aldrich Chemical Company, Inc., 1001 West Saint Paul Avenue, Milwaukee, Wis.) among other electrocatalysts), surfactants, dispersants (for example, to improve the homogeneity of the electrode's ingredients), and additional surface layer forming additives to protect a lithium negative electrode (e.g., organosulfur compounds, phosphates, iodides, iodine, metal sulfides, nitrides, and fluorides). Preferred binders (1) do not swell in the liquid electrolyte and (2) allow partial but not complete wetting of the sulfur by the liquid electrolyte. Examples of suitable binders include Kynar available from Elf Atochem of Philadelphia, Pa., polytetrafluoroethylene dispersions, and polyethylene oxide (of about 900 k molecular weight for example). Other additives include electroactive organodisulfide compounds employing a disulfide bond in the compound's backbone. Electrochemical energy is generated by reversibly breaking the disulfide bonds in the compound's backbone. During charge, the disulfide bonds are reformed. Examples of organodisulfide compounds suitable for use with this invention are presented in U.S. Pat. Nos. 4,833,048 and 4,917,974 issued to DeJonghe et al. and U.S. Pat. No. 5,162,175 issued to Visco et al.

The battery cells of this invention may be rechargeable "secondary" cells. Unlike primary cells which discharge only once, the secondary cells of this invention cycle between discharge and charge at least two times. Typically, secondary cells of this invention will cycle at least 50 times, with each cycle having a sulfur utilization (measured as a fraction of 1675 mAh/g sulfur output during the discharge phase of the cycle) of at least about 10%. More preferably, at least 50 cycles will have a minimum sulfur utilization of at least about 20% (most preferably at least about 30%). Alternatively, the secondary cells of this invention will cycle at least two times, with each cycle attaining at least 50% utilization of sulfur in the positive electrode.

EXAMPLES

The following Examples are provided to illustrate certain aspects of the present invention and to aid those of skill in the art in practicing the invention. These Examples are in no way to be considered to limit the scope of the invention in any manner.

Experiment 1

Capacity of a Lithium Anode with an Aluminum-Lithium Alloy Surface Layer

A laboratory electrochemical cell was constructed containing a lithium anode, a porous sulfur-loaded cathode, and an electrolyte solution containing a supporting salt, LiN$(SO_2CF_3)_2$- lithium bistrifluoromethanesulfonil imide (LiTFSI), dissolved in a mixture of 1,2 dimethoxyethane (DME) with 1,3 dioxolane (Diox). The supporting salt was used at a concentration of 0.5 mole per liter of solution. The ratio of DME to Diox was 9:1 by volume. All electrolyte components were bought from Aldrich.

The separator was a micro-porous polymeric layer having a nominal thickness of 25 microns (Hoechst Celanese, Celgard 2400). The separator was vacuum dried overnight prior to transfer into an argon-filled glovebox. A cathode was made by impregnating a slurry containing elemental sulfur into a carbon fiber paper (Lydall Technical papers, Rochester, N.Y.). The slurry composition was 50 wt % sulfur, 28 wt % carbon black, 20 wt % polyethylene oxide (MW=900 K), and 2 wt % Brij35 dissolved in acetonitrile. The cathode was vacuum dried overnight prior to transfer into the glovebox for final cell assembly.

230 microliters of the electrolyte were placed on the porous cathode followed by placement of the microporous separator on the cathode. An additional 20 microliters of electrolyte were then placed on the separator layer. Once assembled, the cell was compressed at 2 psi. The cell was then tested at 25° C. with a Series 4000 battery test system from Maccor Inc. of Tulsa, Okla.

Figure 6:
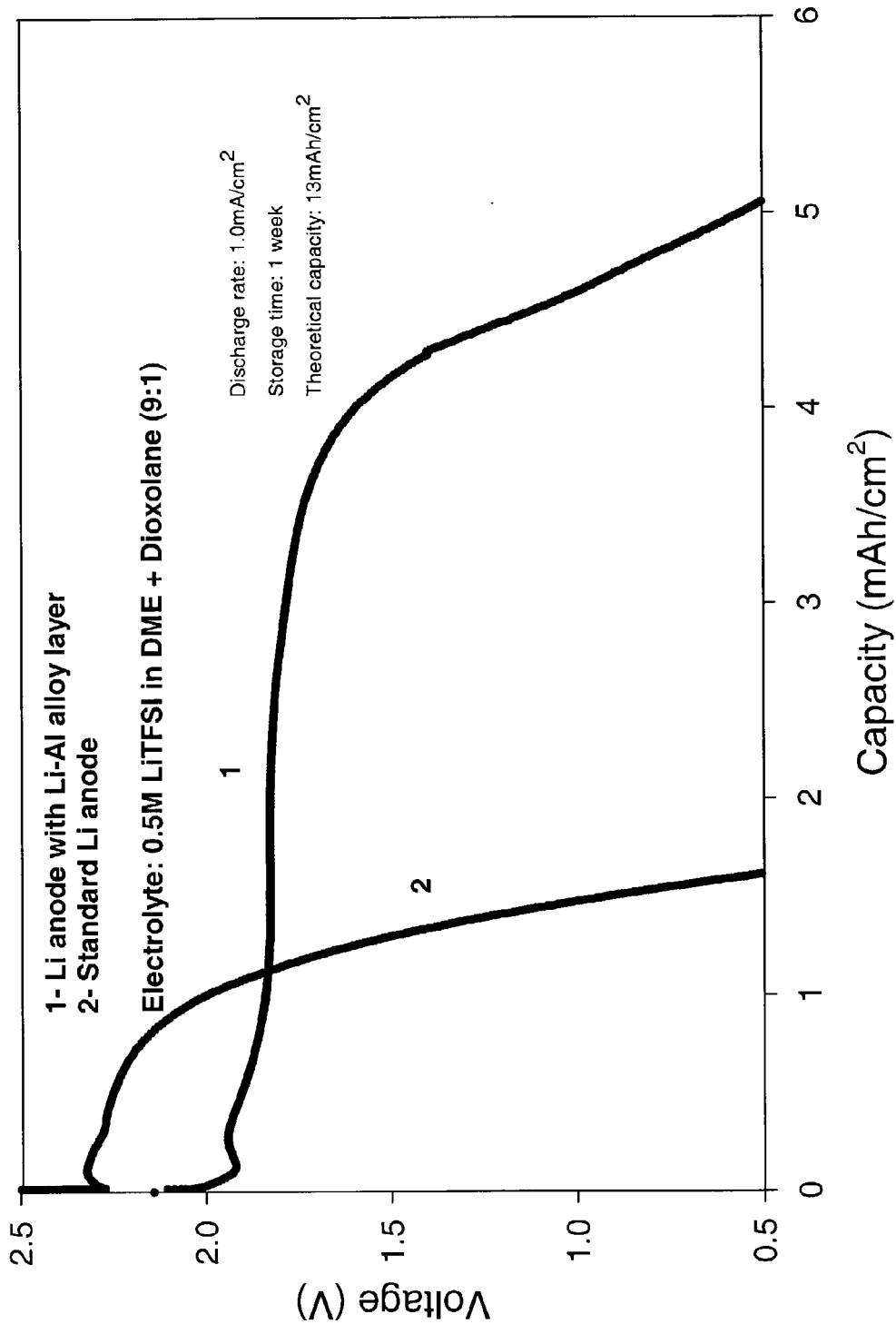
FIG. 6 illustrates effect of aluminum-lithium alloy layer on discharge characteristics of Li/S cells after storage.

The thin layer of Li—Al alloy was formed on the lithium anode surface by laminating thin Al foil (0.8 $\mu$m thick from Alpha Aesar Co.) onto the surface of Li foil (125 $\mu$m thick from Argo-Tech Co.) and storing the resulting structure between two glass plates at 55° C. for one day and then at room temperature for one day in an argon-filled glove box. Glass plates were clamped together to maintain good contact between Li and Al surfaces. Process of Li—Al alloy formation was monitored through the glass plates. Since the light reflectance of smooth aluminum foil is very high, while the reflectance of the alloy is much lower, the observed drop in reflectance corresponded to completion of alloy formation. Then, Li/S cell was assembled. The cells with S-loaded cathodes were stored for one week at open circuit potential (OCP) and discharged at 1.0 mA/cm$^2$ to cut-off voltage 1.25 V. The cell having Li electrode coated with Li—Al and passivating layer exhibited about 3.5 times larger capacity than the cell without Li—Al (See FIG. 6).

Experiment 2

Figure 7:
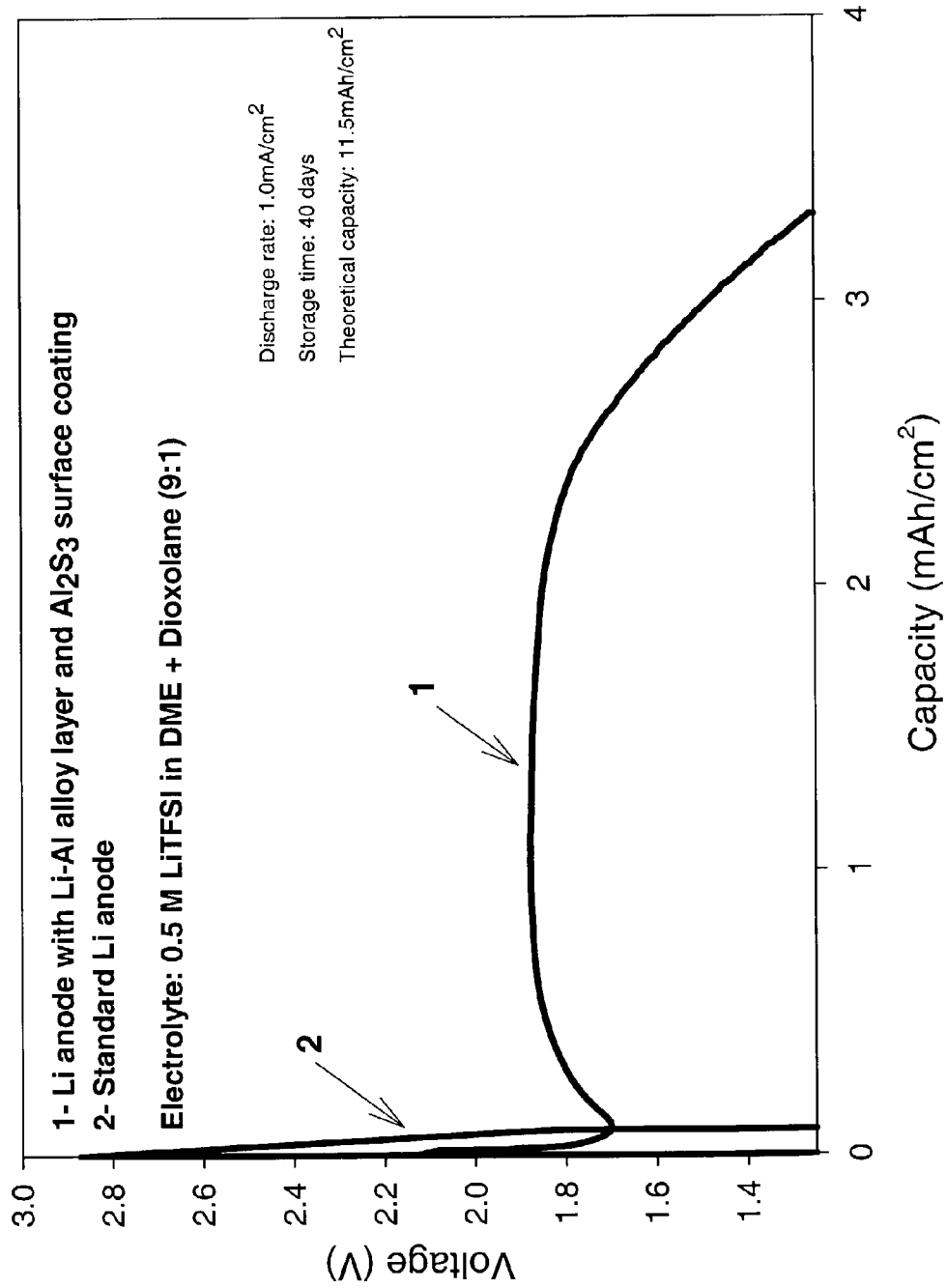
FIG. 7 illustrates effect of aluminum-lithium alloy layer and surface coating with $Al_2S_3$ on discharge characteristics of Li/S cells after storage.

Capacity of a Lithium Anode with an Aluminum-Lithium Alloy Surface Layer and an Al$_2$S$_3$ Surface Coating In this experiment cells similar to the ones used in Experiment 1 were tested to obtain Li electrode capacity values. The thin layer of Li—Al alloy was formed by laminating thin Al foil (7.0 $\mu$m thick from Alpha Aesar Co.) onto the surface of Li foil (125 $\mu$m thick from Argo-Tech Co.) and storing the resulting structure between two glass plates at room temperature for one day in an argon-filled glove box. Glass plates were clamped together to maintain good contact between Li and Al surfaces. The process of Li—Al alloy formation was monitored through the glass plates. No change in Al reflectance was observed. Thus, Al foil was not fully converted into Li—Al alloy, and some pure Al was left on the surface. The formed laminate had a structure: bulk Li/Li—Al alloy/Al. Then, the Li/S cell was assembled, and hence, Al surface was placed in contact with an electrolyte containing dissolved elemental S. A thin film of Al$_2$S$_3$ was quickly formed on the Al surface. Then, the cell was stored under OCP conditions at room temperature for 7 days and discharged at 1.0 mA/cm$^2$ to cut-off voltage 0.5 V. The cell having Li electrode coated with Li—Al and Al$_2$S$_3$ layer exhibited about 3 times larger capacity than the control cell without Li—Al and Al$_2$S$_3$ layer on the Li surface tested under same conditions (See FIG. 7).

Experiment 3

The Cycling Performance of a Lithium Anode with an Aluminum-Lithium Alloy Surface Layer In this experiment cells similar to the ones used in Experiment 1 were tested to obtain cycling performance data. The anodes having Li coated with Li—Al layer were prepared and the Li/S cells were assembled as in Experiment 1. The cells with the such anodes and the control cells without Li—Al layer on the Li surface were stored at OCP for 1 week and after that cycled at discharge/charge current density 1.0/0.5 mA/cm$^2$. The control cells exhibited very poor cycleability. Performance of the cells with Li—Al was much better under the same testing conditions (See FIG. 8).

Bibliography

The following references are incorporated herein by reference in their entirety and for all purposes.

De Gott, P. (1986). *Polymere Carbone-Soufre Synthèse et Propriétes Electrochimiques*, Institute National Polytechnique de Grenoble.

Rao, et al. (1977). "Lithium-Aluminum Electrode." *J. Electrochem. Soc.* 124(10): 1490.

Rauh, et al. (1979). "A Lithium/Dissolved Sulfur Battery with an Organic Electrode." *J. Electrochem. Soc.* 126(4): 523.

Rauh, et al. (1989). "Rechargeable Lithium-Sulfur Battery." *J. Power Sources* 26: 269.

What is claimed:

1. An electrochemical cell, comprising:
   a positive electrode including at least one of elemental sulfur, lithium sulfide, and a lithium polysulfide; and
   an anode comprising,
   a lithium metal layer, and
   a ternary alloy layer on the lithium metal layer comprising Li, a first metal and a second metal that is effective to increase lithium cycling efficiency and anode stability towards electrolyte components during storage of said electrochemical cell, wherein the first metal provides a matrix that accommodates volume changes in the ternary alloy layer during lithium cycling and wherein the second metal alloys with lithium and the first metal.

2. The electrochemical cell of claim 1, wherein said anode is in an electrolyte solution.

3. The electrochemical cell of claim 2, wherein said electrolyte solution contains at least one of elemental sulfur, a sulfide, and a polysulfide.

4. The electrochemical cell of claim 2, wherein said electrolyte solution contains 1,3-dioxolane as a co-solvent.

5. The electrochemical cell of claim 1, wherein the first metal is copper and wherein the second metal is selected from group consisting of tin, silicon, germanium and lead.

6. The electrochemical cell of claim 1, wherein the first metal is iron and the second metal is tin.

7. The electrochemical cell of claim 6, wherein the tin and the lithium alloy to form Li$_{4.4}$Sn.

8. The electrochemical cell of claim 1, wherein the first metal is copper and the second metal is tin and wherein the copper to tin ratio is greater than the stoichiometric ratio of copper to tin in the intermetallic compound Cu$_6$Sn$_5$.

9. An anode for use in an electrochemical cell, said anode comprising:
   a lithium metal layer; and
   a ternary alloy layer on the lithium metal layer comprising Li, a first metal and a second metal that is effective to increase lithium cycling efficiency and anode stability towards electrolyte components during storage of said electrochemical cell, wherein the first metal provides a matrix that accommodates volume changes in the ternary alloy layer during lithium cycling and wherein the second metal alloys with lithium and the first metal.

10. The anode of claim 9, wherein the ternary alloy layer is between 0.05 and 60 microns thick.

11. The anode of claim 9, wherein the anode is in an electrolytic solution containing elemental sulfur or polysulfides.

12. The anode of claim 9, wherein the first metal is copper wherein the first metal is copper and wherein the second metal is selected from group consisting of tin, silicon, germanium and lead.

13. The anode of claim 9, wherein the first metal is iron and the second metal is tin.

14. The anode of claim 13, wherein the tin and the lithium alloy to form $Li_{4.4}Sn$.

15. The anode of claim 9, wherein the first metal is copper and the second metal is tin and wherein the copper to tin ratio is greater than the stoichiometric ratio of copper to tin in the intermetallic compound $Cu_6Sn_5$.

16. A method of forming a lithium anode with a ternary alloy layer for an electrochemical cell, the method comprising:
    depositing a first metal layer on an outer surface of a lithium foil;
    depositing a second metal layer on an outer surface of the lithium foil;
    alloying the first metal layer and the second metal layer on the outer surface of the lithium foil to form a first metal-second metal alloy layer; and
    alloying the lithium foil and the first metal-second metal alloy layer on the outer surface of the lithium foil to form a ternary alloy layer comprising lithium, the first metal and the second metal;
    wherein said lithium anode is effective to increase lithium cycling efficiency and anode stability towards electrolyte components during storage of said electrochemical cell.

17. The method of claim 16, wherein said first metal layer is deposited using sputtering, plasma deposition, rolling or physical deposition.

18. The method of claim 16, wherein said second metal layer is deposited using sputtering, plasma deposition, rolling or physical deposition.

19. The method of claim 16, wherein said ternary alloy layer is between about 0.05 to 60 microns thick.

20. The method of claim 16, wherein said lithium electrode is in an electrolyte solution.

21. The method of claim 16, wherein said electrolyte solution contains at least one of elemental sulfur, a sulfide, and a polysulfide.

22. The method of claim 16, wherein the first metal layer does not alloy with lithium.

23. The method of claim 16, wherein the first metal layer is copper and wherein the second metal layer is selected from group consisting of tin, silicon, germanium and lead.

24. The method of claim 16, wherein the first metal layer is iron and the second metal layer is tin.

25. The method of claim 24, wherein the tin and the lithium alloy to form $Li_{4.4}Sn$.

26. The method of claim 16, wherein the first metal layer is copper and the second metal layer is tin and wherein the copper to tin ratio is greater than the stoichiometric ratio of copper to tin in the intermetallic compound $Cu_6Sn_5$.

27. A battery cell comprising:
    a. a positive electrode comprising a mixture of
        i. an electrochemically active material, and
        ii. an electronically conductive material,
    b. an anode comprising a lithium metal layer and a ternary alloy layer on the lithium metal layer comprising lithium, a first metal and a second metal that is effective to increase lithium cycling efficiency and anode stability towards electrolyte components during storage of said electrochemical cell, wherein the first metal provides a matrix that accommodates volume changes in the ternary alloy layer during lithium cycling and wherein the second metal alloys with lithium and the first metal; and
    c. an electrolyte electronically separating the positive and negative electrodes.

28. The battery cell of claim 27, wherein the first metal is copper and wherein the second metal is selected from group consisting of tin, silicon, germanium and lead.

29. The battery cell of claim 27, wherein the first metal is iron and the second metal is tin.

* * * * *

UNITED STATES PATENT AND TRADEMARK OFFICE
CERTIFICATE OF CORRECTION

PATENT NO. : 6,955,866 B2
DATED : October 18, 2005
INVENTOR(S) : Nimon et al.

It is certified that error appears in the above-identified patent and that said Letters Patent is hereby corrected as shown below:

Column 8,
Line 51, change "aluminum-lithium consumes all of the unreacted" to -- aluminum layer 104 is first deposited on the --.

Signed and Sealed this

Twenty-third Day of May, 2006

JON W. DUDAS
*Director of the United States Patent and Trademark Office*